(12) United States Patent
Yoshida

(10) Patent No.: US 8,902,373 B2
(45) Date of Patent: Dec. 2, 2014

(54) LIQUID CRYSTAL DISPLAY DEVICE

(75) Inventor: Keisuke Yoshida, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 148 days.

(21) Appl. No.: 13/582,075

(22) PCT Filed: Mar. 2, 2011

(86) PCT No.: PCT/JP2011/054743
§ 371 (c)(1),
(2), (4) Date: Aug. 31, 2012

(87) PCT Pub. No.: WO2011/108578
PCT Pub. Date: Sep. 9, 2011

(65) Prior Publication Data
US 2012/0327354 A1 Dec. 27, 2012

(30) Foreign Application Priority Data
Mar. 4, 2010 (JP) .................................. 2010-047950

(51) Int. Cl.
*G02F 1/1343* (2006.01)
*G02F 1/1362* (2006.01)
*G09G 3/36* (2006.01)
*G02F 1/136* (2006.01)

(52) U.S. Cl.
CPC ........ *G02F 1/136286* (2013.01); *G09G 3/3655* (2013.01); *G02F 2001/134345* (2013.01); *G02F 2001/13606* (2013.01); *G09G 2300/0426* (2013.01); *G09G 2300/0447* (2013.01); *G09G 2320/028* (2013.01)
USPC ................ 349/38; 349/139; 349/143; 345/57

(58) Field of Classification Search
CPC ............................................ G09G 2300/0447
USPC .......................................................... 349/38
See application file for complete search history.

(56) References Cited

U.S. PATENT DOCUMENTS 6,958,791 B2 10/2005 Shimoshikiryo
7,372,533 B2 5/2008 Inoue et al.
(Continued)

FOREIGN PATENT DOCUMENTS

JP 05-053136 A 3/1993
JP 2002-357830 A 12/2002
(Continued)

OTHER PUBLICATIONS

Official Communication issued in International Patent Application No. PCT/JP2011/054743, mailed on Apr. 5, 2011.
(Continued)

*Primary Examiner* — Michael Caley
*Assistant Examiner* — Edmond Lau
(74) *Attorney, Agent, or Firm* — Keating & Bennett, LLP

(57) ABSTRACT

A liquid crystal display device (100) according to the present invention includes an active matrix substrate (120); a counter substrate (140); and a liquid crystal layer (160). Each of pixels (P) includes sub pixels (Spa, Spb) respectively having liquid crystal capacitances (CLa, CLb) and storage capacitances (CCa, CCb). A gate bus line (Lg) includes gate lines (Lga, Lgb) electrically connected to gates of thin film transistors (130*a*, 130*b*) and a connection line (Lgc) for electrically connecting the gate line (Lga) and the gate line (Lgb) to each other. A sub pixel electrode (124*a*) strides over the gate line (Lga), and a sub pixel electrode (124*b*) strides over the gate line (Lgb). Owing to this, change of a parasitic capacitance caused by an alignment shift between the sub pixel electrode and the gate bus line is suppressed.

7 Claims, 10 Drawing Sheets

(56) References Cited

U.S. PATENT DOCUMENTS

| | | |
|---|---|---|
| 7,499,132 B2 | 3/2009 | Hanaoka et al. |
| 7,843,531 B2 | 11/2010 | Nakanishi et al. |
| 2006/0066796 A1* | 3/2006 | Ohashi et al. ............ 349/139 |
| 2006/0164352 A1 | 7/2006 | Yoo et al. |
| 2007/0085959 A1 | 4/2007 | Kim |
| 2009/0073358 A1* | 3/2009 | Taguchi et al. .......... 349/109 |
| 2010/0007810 A1* | 1/2010 | Nakamura ................. 349/38 |

FOREIGN PATENT DOCUMENTS

| | | |
|---|---|---|
| JP | 2003-177418 A | 6/2003 |
| JP | 2004-062146 A | 2/2004 |
| JP | 2006-078968 A | 3/2006 |
| JP | 2006-098613 A | 4/2006 |
| JP | 2006-209135 A | 8/2006 |
| JP | 2007-094262 A | 4/2007 |
| JP | 2007-108755 A | 4/2007 |

OTHER PUBLICATIONS

Hanaoka et al: "40.1: A New MVA-LCD by Polymer Sustained Alignment Technology"; SID 04 Digest, 2004; pp. 1200-1203.

English translation of Official Communication issued in corresponding International Application PCT/JP2011/054743, mailed on Oct. 11, 2012.

* cited by examiner

FIG.1
(a)
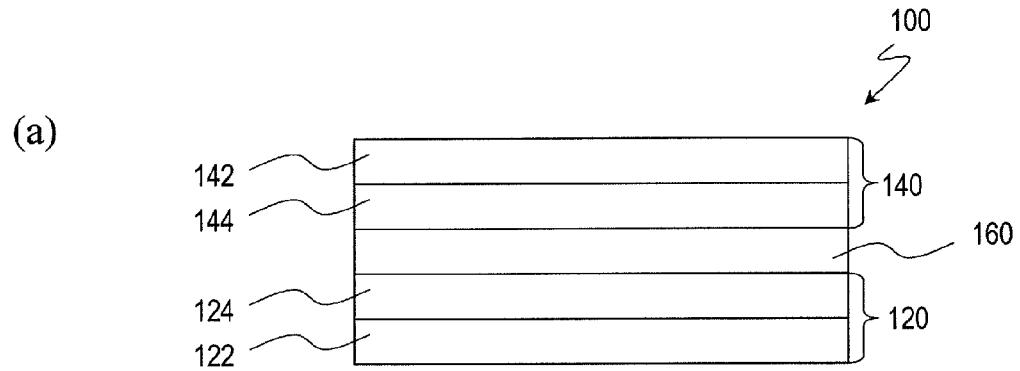
(b)
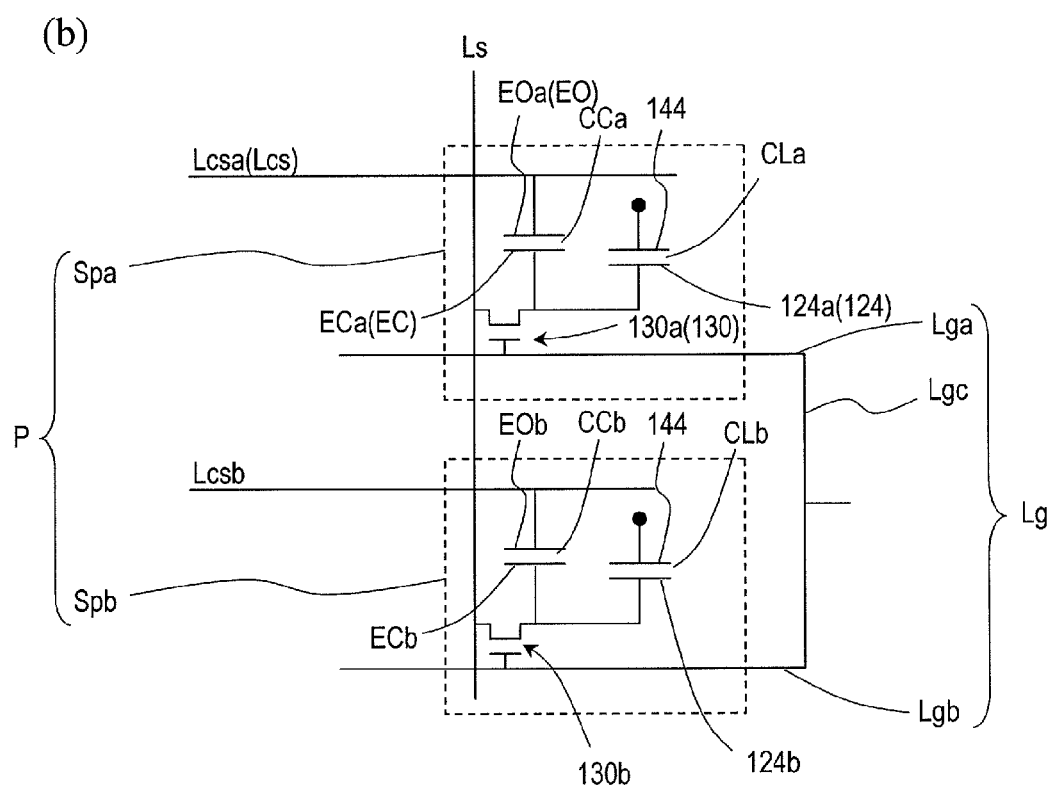
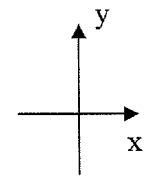

LIQUID CRYSTAL DISPLAY DEVICE

TECHNICAL FIELD

The present invention relates to a liquid crystal display device, and more specifically to a liquid crystal display device in which each of pixels has a plurality of sub pixels.

BACKGROUND ART

Liquid crystal display devices are used as display devices of large screen TVs and also as small display devices of display sections or the like of mobile phones. TN (Twisted Nematic)-mode liquid crystal display devices widely used conventionally have a relatively small viewing angle. Recently, liquid crystal display devices of an IPS (In-Plane-Switching) mode and a VA (Vertical Alignment) mode having a wide viewing angle are produced. Among such wide viewing angle modes, the VA mode can realize a high contrast ratio and thus is adopted in many liquid crystal display devices.

As one type of VA mode, an MVA (Multi-domain Vertical Alignment) mode is known in which a plurality of liquid crystal domains are formed in one pixel area. In an MVA-mode liquid crystal display device, an alignment regulation structure is provided in at least one of a pair of substrates which face each other while having a vertical alignment liquid crystal layer therebetween. The alignment regulation structure is, for example, a linear slit (opening) provided in an electrode or a rib (projection structure) provided on an electrode. Owing to the alignment regulation structure, an alignment regulation force is provided from one surface or both of two surfaces of the liquid crystal layer, and thus a plurality of liquid crystal domains (typically, four liquid crystal domains) having different alignment directions are formed. In this manner, the viewing angle characteristic is improved.

It is known that the VA mode has a disadvantage that the display quality as viewed in a front direction and the display quality as viewed in an oblique direction are conspicuously different from each other. Especially in gray scale display, when an adjustment is made such that the display has an appropriate display characteristic when viewed in the front direction, the display characteristic such as the tinge or the gamma characteristic when viewed in an oblique direction is significantly different from the display characteristic when viewed in the front direction. The optical axial direction of a liquid crystal molecule is the direction of a longer axis thereof. In gray scale display, the optical axial direction of the liquid crystal molecule is tilted by a certain degree with respect to main surfaces of the substrates. When the viewing angle (viewing direction) is changed in this state such that the display is viewed in an oblique direction which is parallel to the optical axial direction of the liquid crystal molecule, the display characteristic is significantly different from the display characteristic as viewed in the front direction. Specifically, a display image viewed in an oblique direction appears to be whitish overall as compared with a display image viewed in the front direction. Such a phenomenon is called "white floating". When, for example, a human face is displayed, the facial expression or the like may be recognized with no unnaturalness in the front direction. However, when viewed in an oblique direction, the face may appear to be whitish overall, and the subtle gray scale representation of the color of the skin is spoiled.

In order to alleviate the white floating, it is known to divide one pixel into a plurality of (typically, two) sub pixels and to apply different effective voltages to the sub pixels. In such a liquid crystal display device, the gray scale characteristic of the sub pixels is adjusted such that the display quality as viewed in an oblique direction is not lower than the display quality as viewed in the front direction (see, for example, Patent Documents 1 through 3).

FIG. 8 shows a liquid crystal display device 700 disclosed in Patent Document 1. In the liquid crystal display device 700, two sub pixel electrodes 724a and 724b are connected to different source bus lines Ls via different TFTs 730a and 730b, respectively. The liquid crystal display device 700 is driven such that the two sub pixel electrodes 724a and 724b have different potentials from each other. Since the potentials of the two sub pixel electrodes 724a and 724b are different like this, areas of a liquid crystal layer corresponding to sub pixels Spa and Spb are supplied with different voltages from each other. Therefore, the sub pixels Spa and Spb have different luminances from each other. As a result, the white floating is alleviated.

FIG. 9 shows a liquid crystal display device 800 disclosed in Patent Document 2. In the liquid crystal display device 800, two sub pixel electrodes 824a and 824b are connected to the same source bus line Ls via different TFTs 830a and 830b, respectively. The two sub pixel electrodes 824a and 824b are respectively connected to storage capacitance bus lines Lcsa and Lcsb via storage capacitances CCa and CCb. The liquid crystal display device 800 is driven such that the potentials of the sub pixel electrodes 824a and 824b are different in accordance with different storage capacitance signal voltages supplied to the different storage capacitance bus lines Lcsa and Lcsb. Since the potentials of the sub pixel electrodes 824a and 824b are different like this, sub pixels Spa and Spb have different luminances from each other. As a result, the white floating is alleviated.

FIG. 10 shows a liquid crystal display device 900 disclosed in Patent Document 3. In the liquid crystal display device 900, two counter electrodes 944a and 944b which may have different potentials from each other are provided for one pixel electrode 924. Since the potentials of the counter electrodes 944a and 944b are different from each other like this, areas of the liquid crystal layer corresponding to the sub pixels Spa and Spb are supplied with different voltages from each other. Therefore, the sub pixels Spa and Spb have different luminances from each other. As a result, the white floating is alleviated.

CITATION LIST

Patent Literature

Patent Document 1: Japanese Laid-Open Patent Publication No. 2006-209135
Patent Document 2: Japanese Laid-Open Patent Publication No. 2004-62146
Patent Document 3: Japanese Laid-Open Patent Publication No. 5-53136

SUMMARY OF INVENTION

Technical Problem

In the liquid crystal display device 700 disclosed in Patent Document 1, the source bus lines are provided by the number which is twice the number of columns of the pixels, and different source signal voltages are applied to different sub pixels. Therefore, the processing amount of the source driver is increased, which increases the power consumption. In addition, it is difficult to apply this structure to a small-size liquid crystal display device which is especially required to be reduced in the power consumption.

In the liquid crystal display device 900 disclosed in Patent Document 3, when a leak occurs between the counter electrodes having different potentials, such a leak occurs in the entire counter electrodes. As a result, an appropriate display cannot be provided.

By contrast, in the liquid crystal display device 800 disclosed in Patent Document 2, the increase of the power consumption due to the increase of the processing amount of the source driver does not occur, and occurrence of a leak between the counter electrodes is suppressed. However, in the liquid crystal display device 800, when a gate bus line is shifted toward one of the two sub pixel electrodes by a shift of alignment, the parasitic capacitances of the sub pixels are changed. As a result, the display quality is declined.

The present invention made in light of the above-described problems has an object of providing a liquid crystal display device which suppresses change of a parasitic capacitance due to an alignment shift between the gate bus line and the sub pixel electrode.

Solution to Problem

A liquid crystal display device according to the present invention includes an active matrix substrate; a counter substrate; and a liquid crystal layer located between the active matrix substrate and the counter substrate. The active matrix substrate includes a plurality of pixel electrodes each for defining each of a plurality of pixels, the plurality of pixel electrodes each including a first sub pixel electrode and a second sub pixel electrode; a plurality of thin film transistors each including a gate, a source and a drain, the plurality of thin film transistors including a first thin film transistor and a second thin film transistor; a plurality of storage capacitance electrodes including a first storage capacitance electrode electrically connected to the drain of the first thin film transistor and the first sub pixel electrode, and a second storage capacitance electrode electrically connected to the drain of the second thin film transistor and the second sub pixel electrode; a plurality of storage capacitance bus lines including a first storage capacitance bus line electrically connected to a first storage capacitance counter electrode which forms a storage capacitance together with the first storage capacitance electrode, and a second storage capacitance bus line electrically connected to a second storage capacitance counter electrode which forms a storage capacitance together with the second storage capacitance electrode; a source bus line electrically connected to the source of the first thin film transistor and the source of the second thin film transistor; and a gate bus line including a first gate line electrically connected to the gate of the first thin film transistor, a second gate line electrically connected to the gate of the second thin film transistor, and a connection line for electrically connecting the first gate line and the second gate line to each other. The first sub pixel electrode strides over the first gate line, and the second sub pixel electrode strides over the second gate line.

In an embodiment, the liquid crystal display device includes a display region in which the plurality of pixels are provided; and a peripheral region in which the connection line is provided.

In an embodiment, the plurality of pixel electrodes are arrayed in a row direction and a column direction; and the first gate line and the second gate line extend in the row direction.

In an embodiment, a size of an overlapping area of the first gate line and the first sub pixel electrode is approximately equal to a size of an overlapping area of the second gate line and the second sub pixel electrode.

In an embodiment, a distance between the center of the first sub pixel electrode and the center of the second sub pixel electrode, a distance between the center line of the first gate line and the center line of the second gate line, and a distance between the center line of the first storage capacitance bus line and the center line of the second storage capacitance bus line are approximately equal to each other.

In an embodiment, the first storage capacitance bus line is supplied with a first storage capacitance signal; and the second storage capacitance bus line is supplied with a second storage capacitance signal which is different from the first storage capacitance signal.

In an embodiment, the liquid crystal layer is of a vertical alignment type.

Advantageous Effects of Invention

A liquid crystal display device according to the present invention can suppress change of a parasitic capacitance due to an alignment shift between the gate bus line and the sub pixel electrode.

BRIEF DESCRIPTION OF DRAWINGS

FIG. 1(*a*) is a schematic view of a liquid crystal display device in an embodiment according to the present invention, and FIG. 1(*b*) is an equivalent circuit diagram of one pixel in the liquid crystal display device.

DESCRIPTION OF EMBODIMENTS

Figure 2:
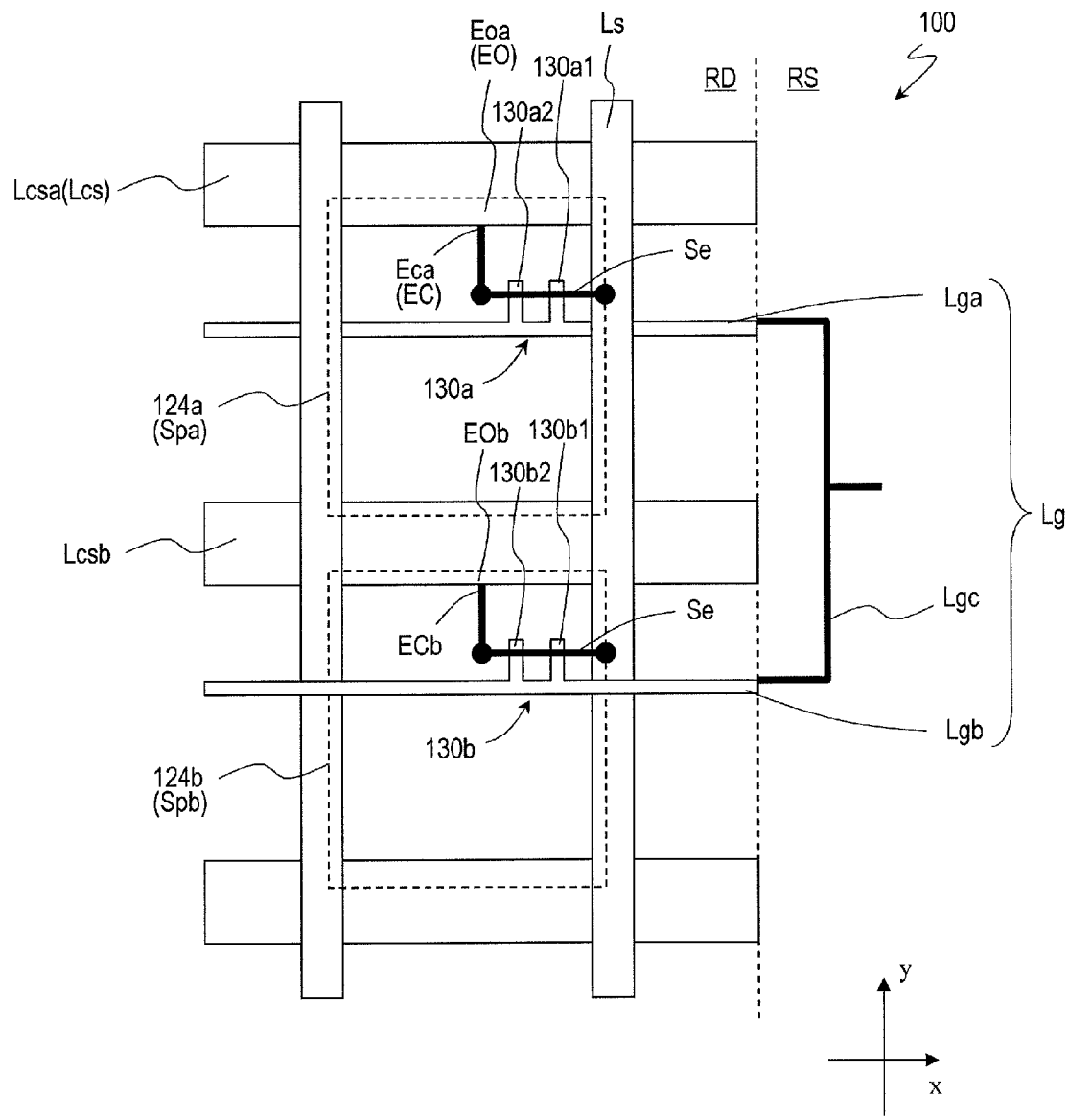
FIG. 2 is a schematic view of the liquid crystal display device shown in FIG. 1.

Hereinafter, with reference to the drawings, a liquid crystal display device in embodiments according to the present invention will be described. Note that the present invention is not limited to the following embodiments.

Hereinafter, a liquid crystal display device in an embodiment according to the present invention will be described. FIG. 1(*a*) is a schematic view of a liquid crystal display device 100 in this embodiment. The liquid crystal display device 100 includes an active matrix substrate 120, a counter substrate 140, and a liquid crystal layer 160 provided between the active matrix substrate 120 and the counter substrate 140. The active matrix substrate 120 includes an insulating substrate 122 and a pixel electrode 124, and the counter substrate 140 includes a transparent insulating substrate 142 and a counter electrode 144. Although not shown in FIG. 1(a), the active matrix substrate 120 typically includes a gate bus line, a storage capacitance bus line, an insulating layer, a source bus line, a thin film transistor, an alignment film and the like. The counter substrate 140 typically includes a color filter layer, an alignment film and the like. Outside the active matrix substrate 120 and the counter substrate 140, polarizing plates are provided.

The alignment films are, for example, vertical alignment films, and the liquid crystal layer 160 is a vertical alignment type liquid crystal layer. Herein, the "vertical alignment type liquid crystal layer" refers to a liquid crystal layer in which the axis of the liquid crystal molecules (also referred to as the "axial azimuth") is aligned at an angle of 85° or greater with respect to surfaces of the vertical alignment films. The liquid crystal layer 160 contains a nematic liquid crystal material having a negative dielectric constant, and provides display in a normally black mode in combination with the polarizing plates which are located in crossed Nicols. In the case where the liquid crystal display device 100 is of a transmission type or of a transreflective type, the liquid crystal display device 100 further includes a backlight unit.

The liquid crystal display device 100 includes pixels arrayed in a matrix of a plurality of rows by a plurality of columns. The pixels are each defined by a pixel electrode 124. Each pixel includes two or more sub pixels which may have different luminances from each other. In the case where the liquid crystal display device 100 provides color display, a red pixel, a green pixel and a blue pixel are provided typically. The red pixel, the green pixel and the blue pixel are realized by arraying red, green and blue color filters in the color filter layer. A color display pixels including the red pixel, the green pixel and the blue pixel in this manner acts as a display unit for displaying an arbitrary color. The color display pixel may further include a pixel of another color (e.g., yellow) in addition to the red, green and blue pixels.

FIG. 1(b) is an equivalent circuit diagram of the liquid crystal display device 100. As described above, the liquid crystal display device 100 includes a plurality of pixels P arrayed in a matrix of a plurality of rows by a plurality of columns. FIG. 1(b) shows an equivalent circuit of one pixel P.

The plurality of pixels P each include sub pixels Spa and Spb which may have different luminances from each other. Herein, the sub pixels Spa and Spb have an equal area size to each other. At least at a certain gray scale level, the luminance of the sub pixel Spa is different from the luminance of the sub pixel Spb. Typically, in an arbitrary frame or field, the luminance of one of the sub pixels is equal to or greater than the luminance of the other sub pixel.

The active matrix substrate 120 includes a pixel electrode 124, thin film transistors (TFTs) 130, source bus lines Ls, a gate bus line Lg, storage capacitance electrodes EC, and storage capacitance bus lines Lcs. The pixel electrode 124 includes a sub pixel electrode 124a corresponding to the sub pixel Spa and a sub pixel electrode 124b corresponding to the sub pixel Spb.

The TFTs 130 each include a gate, a source and a drain. One TFT 130 is provided in correspondence with each of the sub pixels Spa and Spb. In the following description, the TFT 130 corresponding to the sub pixel Spa will be represented as the "TFT 130a", and the TFT 130 corresponding to the sub pixel Spb will be represented as the "TFT 130b".

Each pixel P includes, as the storage capacitance electrodes EC, a storage capacitance electrode ECa electrically connected to the drain of the TFT 130a and the sub pixel electrode 124a and a storage capacitance electrode ECb electrically connected to the drain of the TFT 130b and the sub pixel electrode 124b. Each pixel P includes, as the storage capacitance bus lines Lcs, a storage capacitance bus line Lcsa electrically connected to a storage capacitance counter electrode EOa which forms a storage capacitance together with the storage capacitance electrode ECa, and a storage capacitance bus line Lcsb electrically connected to a storage capacitance counter electrode EOb which forms a storage capacitance together with the storage capacitance electrode ECb. In the following description, the storage capacitance bus lines Lcs may be referred to as the "CS bus lines Lcs".

The source bus line Ls is electrically connected to the source of the TFT 130a and the source of the TFT 130b. The source bus line Ls extends in a column direction (y direction).

The gate bus line Lg includes a gate line Lga electrically connected to the gate of the TFT 130a, a gate line Lgb electrically connected to the gate of the TFT 130b, and a connection line Lgc for electrically connecting the gate line Lga and the gate line Lgb to each other. The gate lines Lga and Lgb both extend in a row direction (x direction).

Since the gate line Lga and the gate line Lgb are electrically connected to each other by the connection line Lgc, the gate line Lga has an equal potential to that of the gate line Lgb. The gate line Lga and the gate line Lgb are each supplied with an equivalent gate signal from a gate driver (not shown). In this manner, in the liquid crystal display device 100, two gate lines Lga and Lgb are provided for one pixel, but the gate lines Lga and Lgb are electrically connected to each other by the connection line Lgc. Therefore, by electrically connecting an output terminal of the gate driver to the connection line Lgc, it is made unnecessary to add another output terminal to the gate driver. Thus, the increase of the power consumption can be suppressed.

The counter substrate 140 includes the counter electrode 144. In the equivalent circuit shown in FIG. 1(b), one counter electrode 144 is provided in correspondence with each of the sub pixels 124a and 124b. However, typically, the counter electrode 144 is provided in correspondence with the pixel electrode 124, which corresponds to the entirety of the plurality of pixels P provided in a display region. Note that the counter electrode 144 may be provided as being divided into a plurality of blocks.

The sub pixel Spa includes a liquid crystal capacitance CLa and a storage capacitance CCa, and the sub pixel Spb includes a liquid crystal capacitance CLb and a storage capacitance CCb. The liquid crystal capacitance CLa is formed of the sub pixel electrode 124a, the counter electrode 144 and an area of the liquid crystal layer 160 which is located therebetween. The liquid crystal capacitance CLb is formed of the sub pixel electrode 124b, the counter electrode 144 and an area of the liquid crystal layer 160 which is located therebetween. The storage capacitance CCa is formed of the storage capacitance electrode ECa, the storage capacitance counter electrode EOa and an area of the insulating layer which is located therebetween. The storage capacitance CCb is formed of the storage capacitance electrode ECb, the storage capacitance counter electrode EOb and an area of the insulating layer which is located therebetween.

In this specification, the sub pixels Spa and Spb may be referred to as a "first sub pixel Spa" and a "second sub pixel Spb", respectively. The sub pixel electrodes 124a and 124b may be referred to as a "first sub pixel electrode 124a" and a "second sub pixel electrode 124b", respectively. The TFTs 130a and 130b may be referred to as a "first thin film transistor 130a" and a "second thin film transistor 130b", respectively. The gate lines Lga and Lgb may be referred to as a "first gate line Lga" and a "second gate line Lgb", respectively. The storage capacitance electrodes ECa and ECb may be referred to as a "first storage capacitance electrode ECa" and a "second storage capacitance electrode ECb", respectively. The storage capacitance bus lines Lcsa and Lcsb may be referred to as a "first storage capacitance bus line Lcsa" or a "first CS bus line Lcsa" and a "second storage capacitance bus line Lcsb" or a "second CS bus line Lcsb". Storage capacitance signals respectively supplied to the CS bus lines Lcsa and Lcsb may be referred to as a "first storage capacitance signal" and a "second storage capacitance signal".

FIG. 2 is a schematic view of the liquid crystal display device 100. In FIG. 2, the counter substrate 140 is omitted in order to avoid the figure from being excessively complicated. FIG. 2 corresponds to a plan view of the active matrix substrate 120. The first sub pixel electrode 124a defines the first sub pixel Spa, and the second sub pixel electrode 124b defines the second sub pixel Spb.

The liquid crystal display device 100 includes a display region RD and a peripheral region RS. The pixels P are provided in the display region RD, and the connection line Lgc is provided in the peripheral region RS. The gate lines Lga and Lgb and the CS bus lines Lcsa and Lcsb extend in the row direction (x direction), and the source bus line Ls extends in the column direction (y direction). In the liquid crystal display device 100, the CS bus lines Lcs are provided so as to overlap an area between the sub pixels Spa and Spb in one pixel P and also an area between the pixels P adjacent to each other in the column direction.

As described above, the gate bus line Lg includes the gate lines Lga and Lgb and the connection line Lgc. The connection line Lgc is formed of the same material as that of, in the same step as that of, the gate lines Lga and Lgb. Note that the connection line Lgc may be formed of a different material from that of, in a different step from that of, the gate lines Lga and Lgb. For example, in the case where gate lines Lga and Lgb are formed of tungsten (W), the connection line Lgc may be formed of aluminum (Al).

In the liquid crystal display device 100, two TFTs 130a1 and 130a2 are provided in correspondence with one sub pixel Spa. The TFTs 130a1 and 130a2 are arrayed in series. Similarly, two TFTs 130b1 and 130b2 are provided in correspondence with one sub pixel Spb. The TFTs 130b1 and 130b2 are arrayed in series. Since the TFTs 130a1 and 130a2 are arrayed in series and also the TFTs 130b1 and 130b2 are arrayed in series, flow of a leak current is suppressed between the source bus line Ls and the sub pixel Spa or between the source bus lines Ls and the sub pixel Spb when the corresponding TFTs are in an off state. In FIG. 2, the two TFTs 130a1 and 130a2 are provided in correspondence with the sub pixel Spa, and the two TFTs 130b1 and 130b2 are provided in correspondence with the sub pixel Spb. Alternatively, one TFT may be provided in correspondence with each of the sub pixels Spa and Spb.

Sources, channels and drains of the TFTs 130a1, 130a2, 130b1 and 130b2 are provided in a semiconductor layer Se. To an area of the semiconductor layer Se other than areas which act as the channels of the TFTs 130a1, 130a2, 130b1 and 130b2, impurities are implanted so that the carrier concentration is increased.

The gates of the TFTs 130a1 and 130a2 are electrically connected to the common gate line Lga, and the gates of the TFTs 130b1 and 130b2 are electrically connected to the common gate line Lgb. The ON/OFF state of each of the TFTs 130a1, 130a2, 130b1 and 130b2 is changed in accordance with a gate signal voltage supplied to the corresponding gate line Lga or Lgb. In the following description, the TFTs 130a1 and 130a2 will be collectively represented as the "TFTs 130a", and the TFTs 130b1 and 130b2 will be collectively represented as the "TFTs 130b".

The sources of the TFTs 130a and 130b are electrically connected to the source bus line Ls via contact holes provided in the insulating layer. The drains of the TFTs 130a and 130b are electrically connected to the sub pixels 124a and 124b respectively via contact holes provided in the insulating layer.

The shortest possible distance between the semiconductor layer Se and the CS bus lines Lcs is relatively short, and a storage capacitance is formed between the semiconductor layer Se and each CS bus line Lcs. Herein, an area of the semiconductor layer Se which forms a storage capacitance together with the first CS bus line Lcsa is the first storage capacitance electrode ECa, and an area of the semiconductor layer Se which forms a storage capacitance together with the second CS bus line Lcsb is the second storage capacitance electrode ECb. An area of the CS bus line Lcsa which forms a storage capacitance together with the semiconductor layer Se is the first storage capacitance counter electrode EOa, and an area of the CS bus line Lcsb which forms a storage capacitance together with the semiconductor layer Se is the second storage capacitance counter electrode EOb. Herein, the storage capacitance counter electrodes EOa and EOb are integrally provided with the CS bus lines Lcsa and Lcsb, respectively. Alternatively, the storage capacitance counter electrodes EOa and EOb may be separate from the CS bus lines Lcsa and Lcsb, respectively. Herein, the storage capacitance electrodes ECa and ECb are each provided as a part of the semiconductor layer Se. Alternatively, the storage capacitance electrodes ECa and ECb may be provided separately from the semiconductor layer Se.

As described above, in the liquid crystal display device 100, the gate bus line Lg includes the gate lines Lga and Lgb each supplied with an equivalent gate signal. As viewed in a direction normal to the display screen, two sides defining a width of the gate line Lga are located between two sides defining a length of the sub pixel electrode 124a in the column direction (y direction), and two sides defining a width of the gate line Lgb are located between two sides defining a length of the sub pixel electrode 124b in the column direction. In this manner, the sub pixel electrode 124a is located to stride over the gate line Lga, and the sub pixel electrode 124b is located to stride over the gate line Lgb. The width of the gate line Lga is approximately equal to the width of the gate line Lgb, and the width of each of the gate lines Lga and Lgb is, for example, 4 μm. The size of an overlapping area of the gate line Lga and the sub pixel electrode 124a is approximately equal to the size of an overlapping area of the gate line Lgb and the sub pixel electrode 124b.

The sub pixel electrodes 124a and 124b are adjacent to each other in the column direction. In the liquid crystal display device 100, the sub pixel electrode 124a has substantially the same shape as that of the sub pixel electrode 124b. For example, the length of each of the sub pixel electrode 124a and 124b in the column direction is about 1.5 times the length of each of the sub pixel electrode 124a and 124b in the row direction.

The sub pixels Spa and Spb have substantially the same structure as each other. Specifically, the distance between the center of the sub pixel electrode 124a and the center of the sub pixel electrode 124b, the distance between the center line of the gate line Lga and the center line of the gate line Lgb, and the distance between the center line of the CS bus line Lcsa and the center line of the CS bus line Lcsb are approximately equal to each other. For example, these distances are approximately 1.5 times the length of each of the sub pixel electrodes 124a and 124b in the row direction. In this manner, the sub pixels Spa and Spb are formed to be congruent to each other.

In the liquid crystal display device 100, write to a pixel P is performed as follows. First, a gate signal voltage supplied to the gate bus line Lg is changed from an OFF voltage to an ON voltage. As described above, the gate line Lga is electrically connected to the gate line Lgb via the connection line Lgc. When an ON voltage is applied to the gate bus line Lg and thus the first thin film transistor 130a and the second thin film transistor 130b are put into an ON state, the source signal applied to the source bus line Ls is supplied to the sub pixel electrodes 124a and 124b via the TFTs 130a and 130b.

Then, when the gate signal voltage supplied to the gate bus line Lg is changed to an OFF voltage, the TFTs 130a and 130b are changed to an OFF state. Precisely, immediately after the TFTs 130a and 130b are changed to an OFF state, the potentials of the sub pixel electrodes 124a and 124b are decreased to substantially the same level due to the feedthrough phenomenon caused by an influence of, for example, parasitic capacitances of the TFTs 130a and 130b. Nonetheless, the sub pixel electrodes 124a and 124b have an approximately equal potential to each other.

Then, the storage capacitance signal voltages supplied to the CS bus lines Lcsa and Lcsb are changed, and the potentials of the sub pixel electrodes 124a and 124b change in accordance with the change of the storage capacitance signal voltages. These storage capacitance signal voltages are changed such that a HIGH voltage period and a LOW voltage period thereof are approximately equal to each other during the period after a certain gate bus line Lg is selected until the same gate bus line Lg is selected the next time. For example, these storage capacitance signals include a vibration waveform which is changed to a HIGH voltage and to a LOW voltage at an interval of an equal period.

The storage capacitance signal voltages supplied to the CS bus lines Lcsa and Lcsb are changed in different directions from each other, and the potentials of the sub pixel electrodes 124a and 124b are changed in different directions from each other in accordance with the change of the storage capacitance signal voltages. For example, in the case where, after the TFTs 130a and 130b are changed to an OFF state, the first change of the storage capacitance signal voltage supplied to the CS bus line Lcsa is "increase", the first change of the storage capacitance signal voltage supplied to the CS bus line Lcsb is "decrease". At this point, the average potential of the sub pixel electrodes 124a is increased, and the average potential of the sub pixel electrodes 124b is decreased. By contrast, in the case where the first change of the storage capacitance signal voltage supplied to the CS bus line Lcsa is "decrease", the first change of the storage capacitance signal voltage supplied to the CS bus line Lcsb is "increase". At this point, the average potential of the sub pixel electrodes 124a is decreased, and the average potential of the sub pixel electrodes 124b is increased.

The storage capacitance signal voltage may be changed before the time when the gate signal voltage supplied to the gate bus line Lg which is to be selected next (typically, the gate bus line adjacent to the gate bus line immediately previously selected) is changed from an OFF state to an ON state, or may be changed after such time. By supplying the first and second storage capacitance signals different from each other to the first and second CS bus lines Lcsa and Lcsb, the effective voltages of the sub pixels Spa and Spb can be made different from each other, as described above. Utilizing this, the viewing angle dependence of the γ characteristic can be improved.

Regarding a specific pixel P, in the case where the potentials of the sub pixel electrodes 124a and 124b are higher than the potential of the counter electrode 144 in a certain vertical scanning period, the potential of the counter electrode 144 is higher than the potentials of the sub pixel electrodes 124a and 124b in the next vertical scanning period (next field period or next frame period). In this manner, the polarity of the pixel P is inverted every vertical scanning period. In the following description in this specification, "+ (plus)" means that the potential of the sub pixel electrode is higher than the potential of the counter electrode; whereas "– (minus)" means that the potential of the counter electrode is higher than the potential of the sub pixel electrode. The polarity represents the direction of the electric field applied to the liquid crystal layer.

By such polarity inversion, DC components of the voltage applied to the liquid crystal layer is mostly suppressed. However, the DC components cannot be completely removed merely by polarity inversion. As described above, after the TFT is changed to an OFF state, the potential of the sub pixel electrode is decreased due to the feedthrough phenomenon, and the voltage decrease due to the feedthrough phenomenon occurs in a certain direction regardless of the polarity. Therefore, the DC components caused by the feedthrough phenomenon cannot be sufficiently removed merely by polarity inversion. The DC components caused by the feedthrough phenomenon are removed as follows. The voltage of the counter electrode is adjusted such that, for providing display of the same gray scale level, the central value of the potential of the sub pixel electrode which is inverted every vertical scanning period (DC level of the drain electrode; also referred to as the "effective level of the drain voltage") generally matches the voltage of the counter electrode.

Hereinafter, advantages of the liquid crystal display device 100 will be described in comparison with the conventional liquid crystal display devices 700, 800 and 900 shown in FIG. 8, FIG. 9 and FIG. 10.

Figure 8:
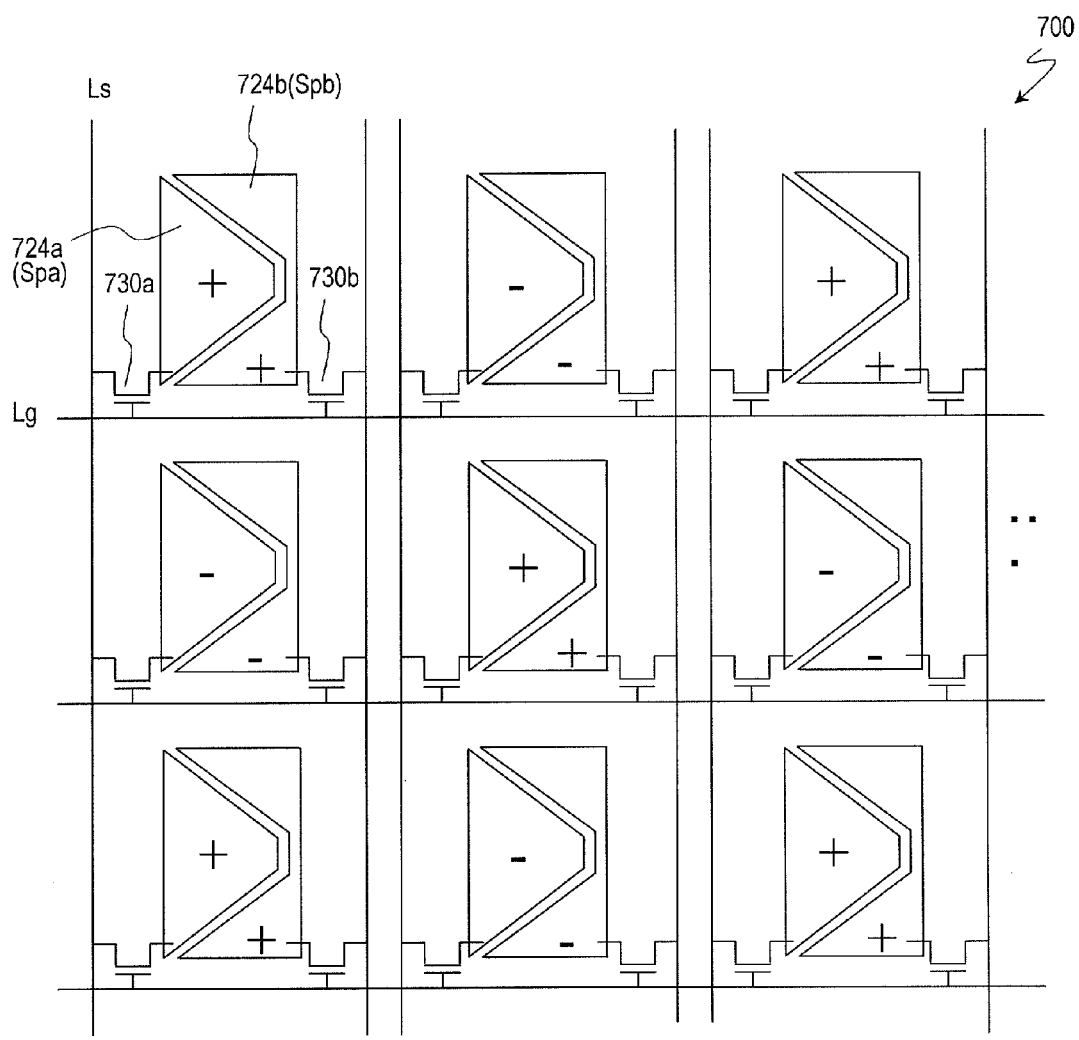
FIG. 8 is a schematic view of a conventional liquid crystal display device.

In the liquid crystal display device 700 shown in FIG. 8, the sub pixels Spa and Spb of each pixel P correspond to different source bus lines Ls, and two source bus lines are provided in correspondence with one column of pixels. Therefore, the aperture ratio is decreased, and the processing amount of the source driver is increased. As a result, the power consumption is increased. By contrast, in the liquid crystal display device 100, the sub pixels Spa and Spb of each pixel P corresponds to a common source bus line Ls. Therefore, the decrease of the aperture ratio is suppressed, and the increase of the power consumption can be suppressed.

Figure 10:
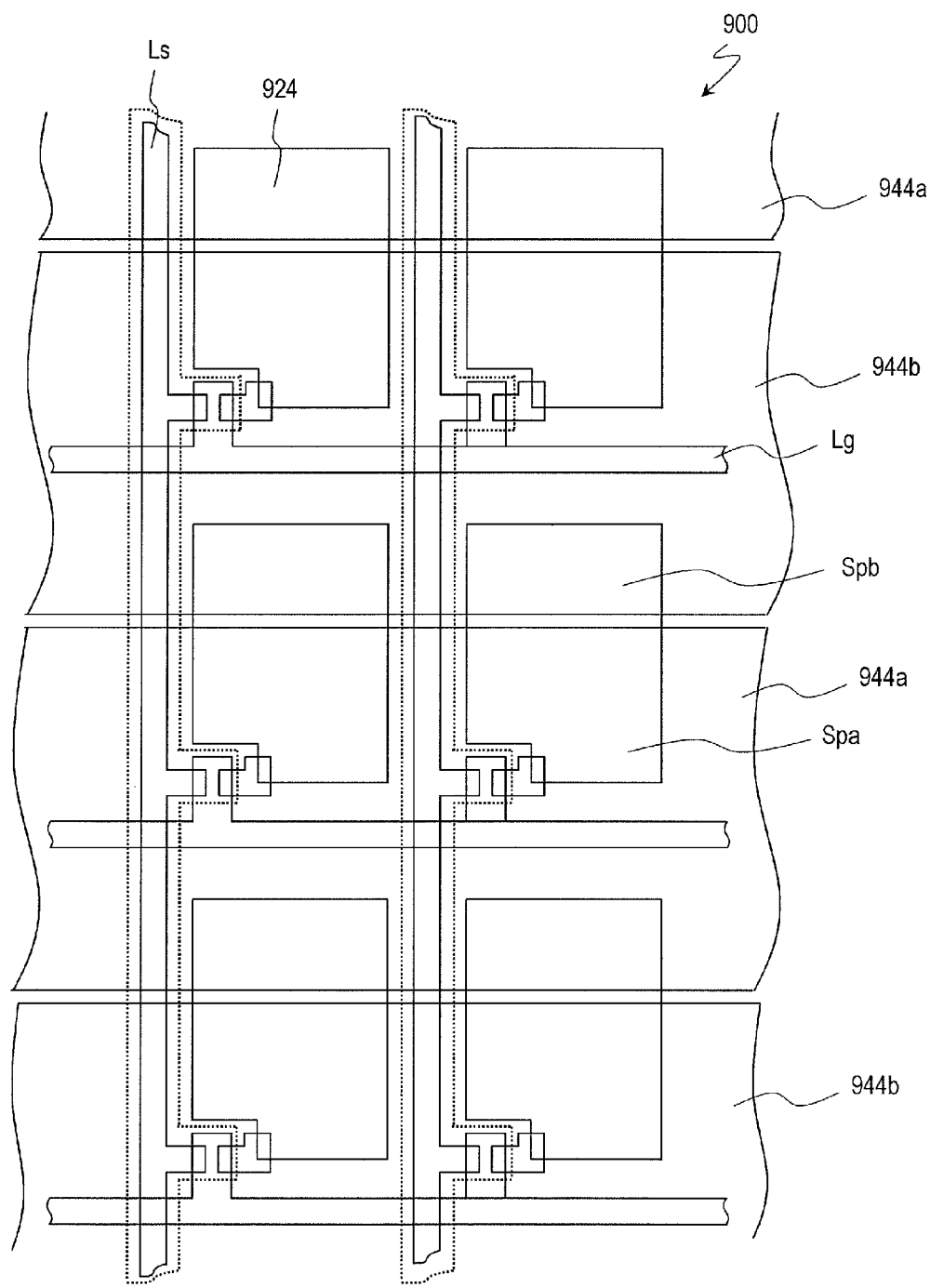
FIG. 10 is a schematic view of still another conventional liquid crystal display device.

In the liquid crystal display device 900 shown in FIG. 10, the pixel electrode 924 in the active matrix substrate is provided for each pixel. In addition, as the counter electrode 944 in the counter substrate, the counter electrodes 944a and 944b which may be supplied with different counter voltages are provided for the sub pixels Spa and Spb of each pixel. In the liquid crystal display device 900, when a leak occurs between the counter electrodes 944a and 944b, an appropriate display cannot be provided. By contrast, in the liquid crystal display device 100, the counter electrode 144 commonly corresponds to the sub pixels Spa and Spb of each pixel P. Therefore, the leak from the counter electrode 144 can be suppressed.

Figure 9:
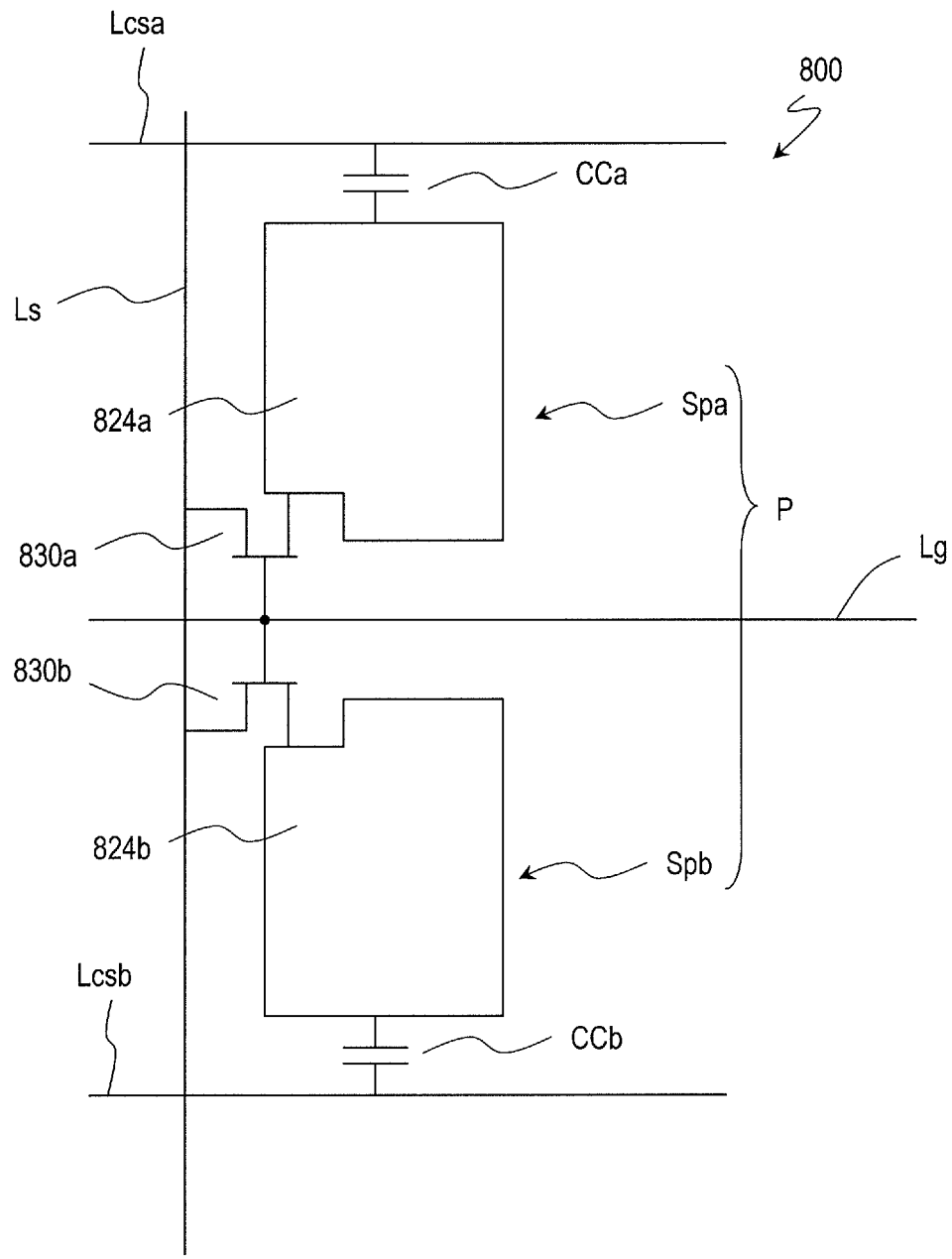
FIG. 9 is a schematic view of another conventional liquid crystal display device.

In the liquid crystal display device 800 shown in FIG. 9, the gate bus line Lg is provided to be located between the sub pixel electrode 824a and the sub pixel electrode 824b. However, when the alignment of the photomask used for forming the gate sub line Lg is shifted in the column direction, the parasitic capacitance between the sub pixel electrode 824a and the gate bus line Lg and the parasitic capacitance between the sub pixel electrode 824b and the gate bus line Lg become significantly different from each other. For example, when the overlapping area size of one of the sub pixel electrodes 824a and 824b and the gate bus line Lg increases and the overlapping area size of the other of the sub pixel electrodes 824a and 824b and the gate bus line Lg decreases in accordance with a shift of the alignment, the parasitic capacitance between the sub pixel electrode 824a and the gate bus line Lg and the parasitic capacitance between the sub pixel electrode 824b and the gate bus line Lg become different from each other. In this case, the feedthrough voltage Vd is different between the sub pixel Spa and the sub pixel Spb. Therefore, even if the voltage of the counter electrode is adjusted, the effective voltages of both of the two sub pixels cannot be sufficiently optimized. For example, when the DC level of the drain voltage of the sub pixel Spa is matched to the counter voltage, the DC level of the drain voltage of the sub pixel Spb does not match the counter voltage. As a result, the DC component is applied to an area of the liquid crystal layer which corresponds to the sub pixel Spb, which declines the display quality.

By contrast, in the liquid crystal display device 100, the first sub pixel electrode 124a strides over the gate line Lga, and the second sub pixel electrode 124b strides over the gate line Lgb. Therefore, even if the alignment of the gate bus line Lg with respect to the sub pixel electrode 124a or 124b is slightly shifted, change of the overlapping area size of the sub pixel electrode 124a and the gate line Lga, and change of the overlapping area size of the sub pixel electrode 124b and the gate line Lgb, can be suppressed. As a result, change of the parasitic capacitance between the sub pixel electrode 124a and the gate line Lga, and change of the parasitic capacitance between the sub pixel electrode 124b and the gate line Lgb, can be suppressed. Therefore, by adjusting the voltage of the counter electrode 144, the effective voltages of both of the two sub pixels Spa and Spb can be optimized, and thus the decline of the display quality can be suppressed. In addition, in the display region RD, the two gate lines Lga and Lgb are provided in correspondence with one pixel, but the gate lines Lga and Lgb are electrically connected to each other by the connection line Lbc. Therefore, it is not needed to increase the number of terminals of the gate driver (not shown). This can suppress the increase of the power consumption. As described above, in the liquid crystal display device 100, the sub pixels Spa and Spb are structured to be congruent to each other. Therefore, even if there is slight dispersion at the time of production, the parasitic capacitances of the sub pixels Spa and Spb can be made approximately equal to each other. Thus, the DC components applied to the areas of the liquid crystal layer which correspond to the sub pixels Spa and Spb can be made approximately equal to each other. As a result, the adjustment of the counter voltage performed to cancel the DC components can be made optimally.

The liquid crystal display device 100 as described above is produced, for example, as follows.

The active matrix substrate 120 is produced as follows. First, the gate bus line Lg and the CS bus lines Lcs are formed on the insulating substrate 122. The insulating substrate 122 is, for example, a glass substrate. The gate lines Lga and Lgb, the connection line Lgc, and the CS bus lines Lcs are formed of the same material in the same step. As described above, the connection line Lgc may be formed of a different material from that of, in a different step from that of, the gate lines Lga and Lgb.

Next, the source bus line Ls is formed on the insulating layer covering the gate bus line Lg and the CS bus lines Lcs. A part of the insulating layer acts as a gate insulating film of the TFTs 130.

Next, the semiconductor layer Se is formed on the insulating layer. The semiconductor layer Se is, for example, a non-crystalline semiconductor layer (typically, an amorphous silicon layer). Alternatively, the semiconductor layer Se may be a polycrystalline semiconductor layer (typically, a polycrystalline silicon layer), or an oxide semiconductor layer. As described above, impurities may be implanted into a prescribed region of the semiconductor layer Se when necessary.

Next, an interlayer insulating layer for covering the semiconductor layer Se is formed, and the pixel electrode 124 is formed on the interlayer insulating layer. The pixel electrode 124 is formed of, for example, a transparent conductive film (typically, an indium tin oxide (ITO) film). Then, the alignment film for covering the pixel electrode 124 is formed.

The gate lines Lga and Lgb, the CS bus lines Lcs, the source bus line Ls, and the pixel electrode 124 are each formed as follows. A conductive material is deposited and exposed to light by use of a photomask formed of a photo resist, and etching is performed. The semiconductor layer Se is formed as follows. A semiconductor material is deposited and exposed to light by use of a photomask formed of a photo resist, and etching is performed. In this manner, the active matrix substrate 120 is produced.

The counter substrate 140 is produced as follows. First, the counter electrode 144 is formed on the transparent insulating substrate 142. The transparent insulating substrate 142 is, for example, a glass substrate. On a surface of the counter substrate 140, an alignment film is provided. In the counter substrate 140, a color filter layer is provided when necessary. The color filter layer includes red, green and blue color filters and a black matrix for enclosing the color filters. In this manner, the counter substrate 140 is produced.

Then, the active matrix substrate 120 and the counter substrate 140 are bonded together. For example, a sealing agent is applied in a rectangular frame shape to one of the active matrix substrate 120 and the counter substrate 140, and a liquid crystal display material is dropped to a region enclosed by the sealing agent. Then, the active matrix substrate 120 and the counter substrate 140 are bonded together, and the sealing agent is cured. The technique of dropping the liquid crystal material provides the following advantages. The liquid crystal material can be provided uniformly and in a short time, and also can be provided at one time to the entirety of a mother glass substrate. In addition, the liquid crystal material can be efficiently used since the amount thereof to be disposed of can be decreased.

Alternatively, the active matrix substrate 120 and the counter substrate 140 may be bonded together as follows. A sealing agent is applied in a partially-opened rectangular frame shape to one of the active matrix substrate 120 and the counter substrate 140. The active matrix substrate 120 and the counter substrate 140 are bonded together to form a vacant cell. Then, a liquid crystal material is injected into a space between the active matrix substrate 120 and the counter substrate 140. Then, the sealing agent is cured. For example, the sealing agent is thermosetting, and is cured by heating. Then, the insulating substrates 122 and 142 of the active matrix substrate 120 and the counter substrate 140 are each provided with a phase plate when necessary, and then with a polarizing plate. In this manner, the liquid crystal display device 100 is produced.

Figure 3:
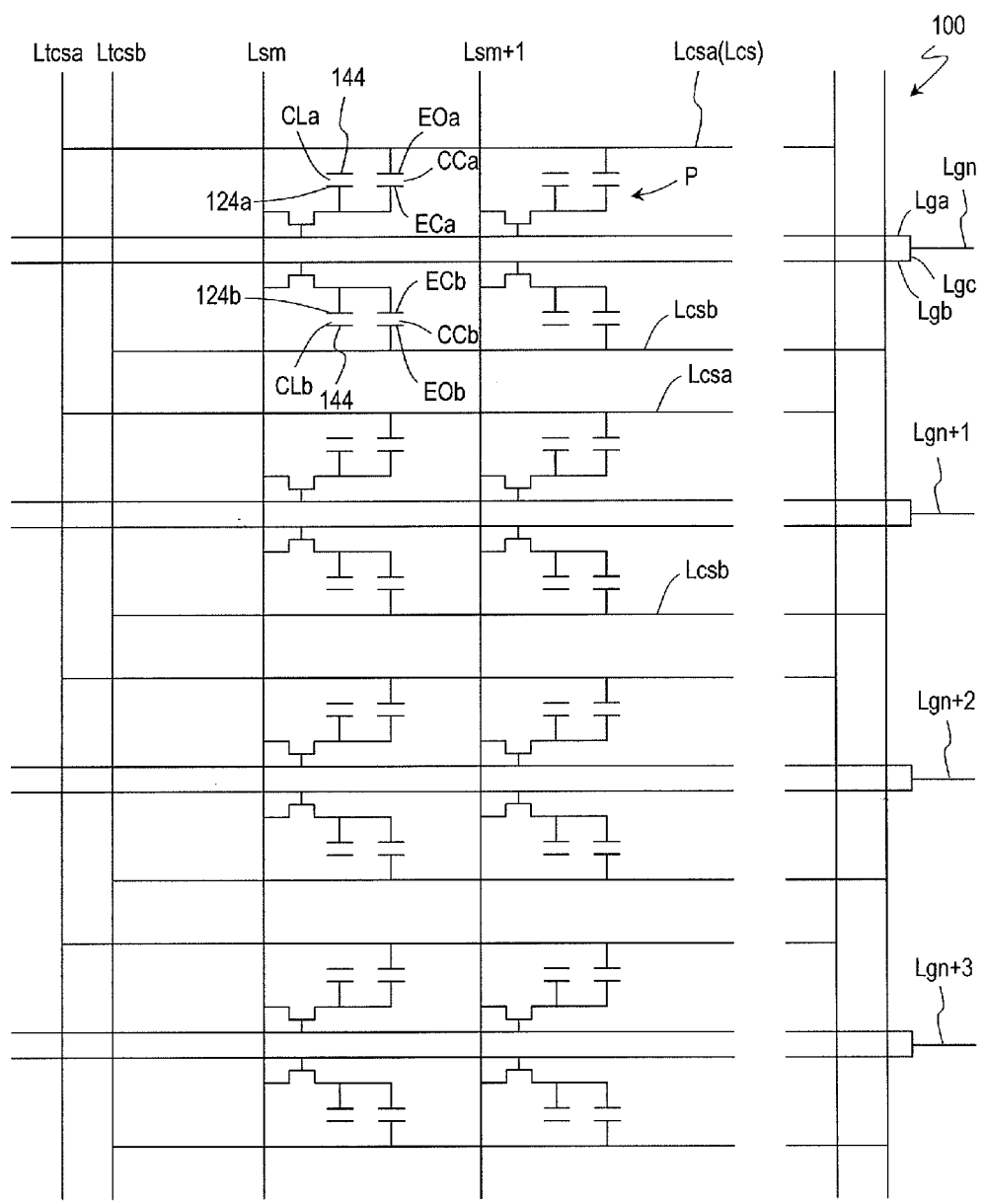
FIG. 3 is an equivalent circuit diagram of the liquid crystal display device shown in FIG. 1.

FIG. 3 is an equivalent circuit diagram of the liquid crystal display device 100. FIG. 3 shows an equivalent circuit of a plurality of pixels P. In FIG. 3, the source bus lines corresponding to the pixels of the m'th column and the (m+1)th column are respectively represented as Lsm and Lsm+1. The gate bus lines corresponding to the pixels of the n'th row through the (n+3)th row are respectively represented as Lgn through Lgn+3. In FIG. 3, the CS bus lines Lcs are shown as not overlapping the pixels P so that the figure is not excessively complicated.

In the liquid crystal display device 100 shown in FIG. 3, the two CS bus lines Lcsa and Lcsb are provided for each row of pixels P. The CS bus line Lcs is provided for each row of sub pixels. The CS bus lines Lcsa and Lcsb are respectively provided with storage capacitance signals from storage capacitance trunk lines Ltcsa and Ltcsb. For example, the CS bus lines Lcsa and Lcsb corresponding to the pixels of the n'th row are respectively supplied with storage capacitance signals from the storage capacitance trunk lines Ltcsa and Ltcsb. The CS bus lines Lcsa and Lcsb corresponding to the pixels of the (n+1)th row are also respectively supplied with storage capacitance signals from the storage capacitance trunk lines Ltcsa and Ltcsb. In this manner, the sub pixels Spa of the pixels P of each row are provided with equivalent storage capacitance signals, and the sub pixels Spb of the pixels P of each row are provided with equivalent storage capacitance signals.

Figure 4:
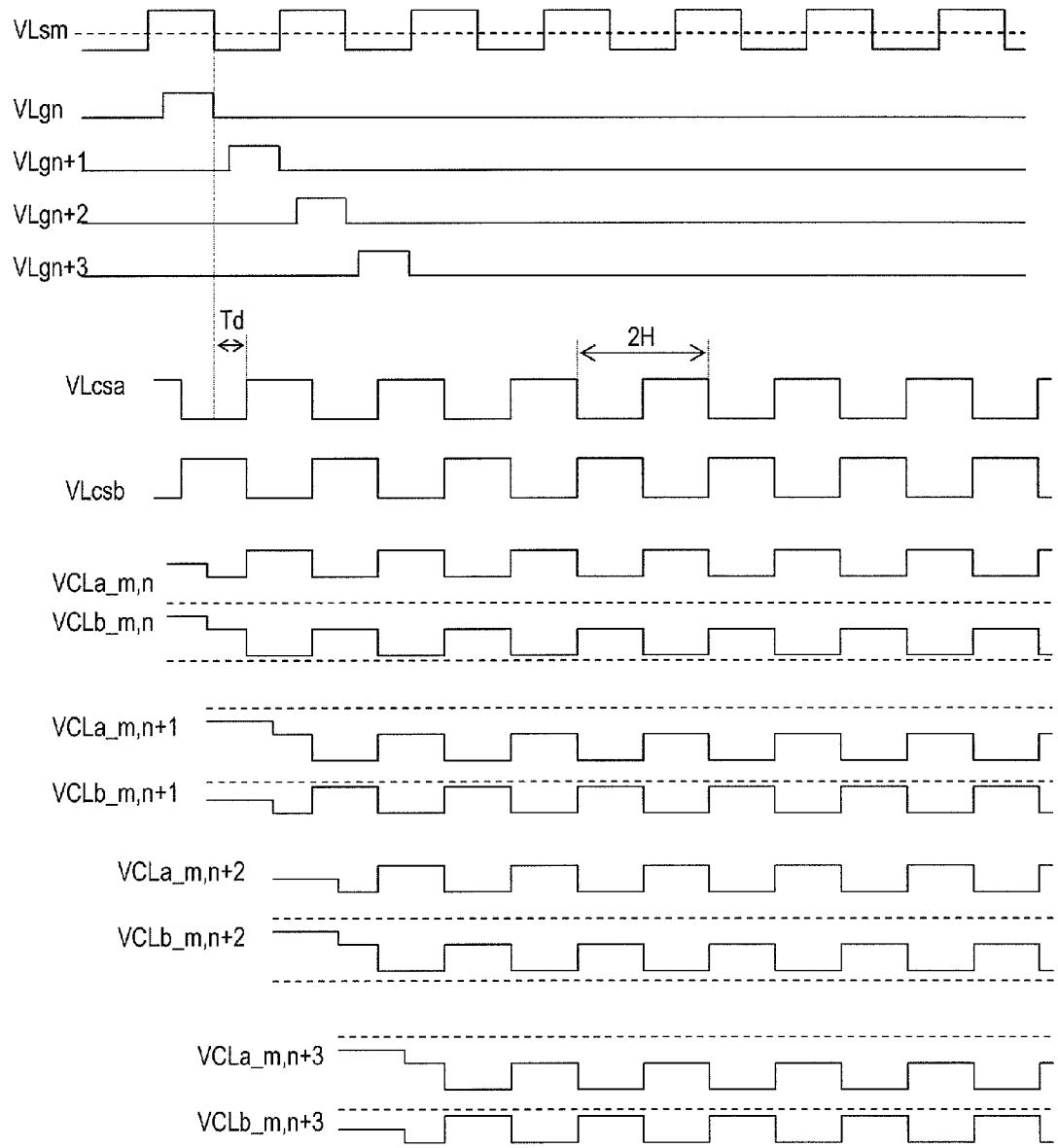
FIG. 4 is a voltage waveform diagram of signals in the liquid crystal display device shown in FIG. 3.

The liquid crystal display device 100 shown in FIG. 3 is driven, for example, as follows. FIG. 4 is a voltage waveform diagram of the liquid crystal display device 100. In FIG. 4, VLsm represents a voltage waveform of a source signal supplied to the source bus line Lsm, which is based on the voltage of the counter electrode 144 shown with the dashed line. VLgn through VLgn+3 respectively represent voltage waveforms of gate signals supplied to the gate bus lines Lgn through Lgn+3. VLcsa and VLcsb respectively represent voltage waveforms of storage capacitance signals supplied to the CS bus lines Lcsa and Lcsb. VCLa_m,n through VCLa_m, n+3 respectively represent the potentials of the sub pixel electrodes 124a of the pixels P at the n'th row by the m'th column through (n+3)th row by the m'th column, which are based on the potential of the counter electrode 144. VCLb_m,n through VCLb_m,n+3 respectively represent the potentials of the sub pixel electrodes 124b of the pixels P at the n'th row by the m'th column through (n+3)th row by the m'th column, which are based on the potential of the counter electrode 144. In order to avoid the explanation from becoming excessively complicated, the input signals which are input herein make the gray scale levels of all the pixels equal to each other.

Herein, the storage capacitance signal voltage VLcsa supplied to the storage capacitance trunk line Ltcsa and the storage capacitance signal voltage VLcsb supplied to the storage capacitance trunk line Ltcsb are each a vibration voltage including a rectangular wave having a duty ratio of 1:1. The vibration cycle of both voltages is twice the horizontal scanning period (time of 2H). The phase of the storage capacitance signal voltage VLcsb is delayed by the time of 1H with respect to the storage capacitance signal voltage VLcsa.

Regarding change of the storage capacitance signal voltages VLcsa and VLcsb supplied to the storage capacitance trunk lines Ltcsa and Ltcsb and of the gate signal voltage VLg of the gate bus line, the time when the gate signal voltage VLg of the gate bus line Lg corresponding to each storage capacitance trunk line is changed from an ON voltage to an OFF voltage matches the central time of the period in which the storage capacitance signal voltages VLcsa and VLcsb are kept constant. A difference Td between the time when the gate signal voltage VLg is changed to an OFF voltage and the time when the storage capacitance signal voltages VLcsa and VLcsb change is the time of 0.5H. Note that Td is not limited to this. The value of Td may be any value which is longer than OH and is shorter than the cycle by which the storage capacitance signal voltages VLcsa and VLcsb are inverted (herein, the time of 1H).

With reference to FIG. 3 and FIG. 4, write to the pixels P in the liquid crystal display device 100 will be described. First, write to the pixels P of the n'th row will be described. Herein, the pixels P at the n'th row by the m'th column and the n'th row by the (m+1)th column will be specifically paid attention to. The gate signal voltages supplied to the gate lines Lga and Lgb are each changed from an OFF voltage to an ON voltage, and as a result, the TFTs 130a and 130b at the n'th row by the m'th column and the n'th row by the (m+1)th column are put into an ON state. When the pixels of the n'th row are selected in this manner, the source signal voltage supplied to the source bus line Lsm is applied to the sub pixel electrodes 124a and 124b at the n'th row by the m'th column, and the source signal voltage supplied to the source bus line Lsm+1 is applied to the sub pixel electrodes 124a and 124b at the n'th row by the (m+1)th column.

Herein, the potentials of the sub pixel electrodes 124a and 124b at the n'th row by the m'th column are higher than the potential of the counter electrode 144. Although not shown in FIG. 4, at this point, the potentials of the sub pixel electrodes 124a and 124b at the n'th row by the (m+1)th column are lower than the potential of the counter electrode 144. In this manner, the relationship between the potentials of the sub pixel electrodes 124a and 124b at the n'th row by the m'th column and the potential of the counter electrode 144 is different from the relationship between the potentials of the sub pixel electrodes 124a and 124b at the n'th row by the (m+1)th column and the potential of the counter electrode 144.

Then, the gate signal voltages supplied to the gate lines Lga and Lgb are each changed from an ON voltage to an OFF voltage, and as a result, the TFTs 130a and 130b at the n'th row by the m'th column and the n'th row by the (m+1)th column are put into an OFF state. Precisely, immediately after the TFTs 130a and 130b are put into an OFF state, the potentials of the sub pixel electrodes 124a and 124b are decreased to substantially the same level due to the feedthrough phenomenon caused by an influence of, for example, parasitic capacitances of the TFTs 130a and 130b. At this point, the potentials of the sub pixel electrodes 124a and 124b at the n'th row by the m'th column are equal to each other, and the potentials of the sub pixel electrodes 124a and 124b at the n'th row by the (m+1)th column are equal to each other.

Then, the storage capacitance signal voltages supplied to the CS bus lines Lcsa and Lcsb are changed in different directions from each other, and as a result, the potentials of the sub pixel electrodes 124a and 124b are changed in different directions from each other. Herein, the first change of the storage capacitance signal voltage VLcsa after the TFTs 130a are changed to an OFF state is "increase", and the average potential of the sub pixel electrodes 124a is increased. The first change of the storage capacitance signal voltage VLcsb after the TFTs 130b are changed to an OFF state is "decrease", and the average potential of the sub pixel electrodes 124b is decreased. Since the polarity of the pixel P at the n'th row by the m'th column is positive, the luminance of the sub pixel Spa is higher than that of the sub pixel Spb in the pixel P at the n'th row by the m'th column. In this specification, among the sub pixels Spa and Spb, a sub pixel having a higher luminance is referred to also as a "bright sub pixel", whereas a sub pixel having a lower luminance is referred to also as a "dark sub pixel".

Although not shown herein, in the pixel P at the n'th row by the (m+1)th column, the average potential of the sub pixel electrodes 124a is increased in accordance with the storage capacitance signal voltage VLcsa, and the average potential of the sub pixel electrodes 124b is decreased in accordance with the storage capacitance signal voltage VLcsb. Note that since the polarity of the pixel P at the n'th row by the (m+1)th column is negative, the luminance of the sub pixel Spb is higher than that of the sub pixel Spa in the pixel P at the n'th row by the (m+1)th column.

In this manner, write to the pixels P of the n'th row is performed. As described above, the polarity of the pixel P at the n'th row by the (m+1)th column is inverted to the polarity of the pixel P at the n'th row by the m'th column. Although not described herein in detail, the polarities of the pixels of the n'th row which are adjacent to each other in the row direction are inverted to each other, similarly to the above. As described above, the sub pixel Spa is a bright sub pixel in the pixel P at the n'th row by the m'th column, whereas the sub pixel Spb is a bright sub pixel in the pixel P at the n'th row by the (m+1)th column. Although not described herein in detail, the bright/dark relationships of the sub pixels in the pixels of the n'th row which are adjacent to each other in the row direction are inverted to each other, similarly to the above.

Next, write to the pixels P in the (n+1)th row will be described. Herein, the pixels P at the (n+1)th row by the m'th column and the (n+1)th row by the (m+1)th column will be specifically paid attention to.

The gate signal voltage supplied to the gate line Lga+1 is changed from an OFF voltage to an ON voltage, and as a result, the TFTs 130a and 130b at the (n+1)th row by the m'th column and the (n+1)th row by the (m+1)th column are put into an ON state. When the pixels of the (n+1)th row are selected in this manner, the source signal voltage supplied to the source bus line Lsm is applied to the sub pixel electrodes 124a and 124b at the (n+1)th row by the m'th column, and the source signal voltage supplied to the source bus line Lsm+1 is applied to the sub pixel electrodes 124a and 124b at the (n+1)th row by the (m+1)th column. Herein, the potentials of the sub pixel electrodes 124a and 124b at the (n+1)th row by the m'th column are lower than the potential of the counter electrode 144. Although not shown in FIG. 4, the potentials of the sub pixel electrodes 124a and 124b at the (n+1)th row by the (m+1)th column are higher than the potential of the counter electrode 144. In this manner, the relationship between the potentials of the sub pixel electrodes 124a and 124b at the (n+1)th row by the m'th column and the potential of the counter electrode 144 is different from the relationship between the potentials of the sub pixel electrodes 124a and 124b at the (n+1)th row by the (m+1)th column and the potential of the counter electrode 144.

Then, the gate signal voltage supplied to the gate line Lga+1 is changed from an ON voltage to an OFF voltage, and as a result, the TFTs 130a and 130b at the (n+1)th row by the m'th column and the (n+1)th row by the (m+1)th column are put into an OFF state. At this point also, the feedthrough phenomenon occurs.

Then, the storage capacitance signal voltages supplied to the CS bus lines Lcsa and Lcsb are changed in different directions from each other, and as a result, the potentials of the sub pixel electrodes 124a and 124b are changed in different directions from each other. Herein, the first change of the storage capacitance signal voltage VLcsa after the TFTs 130a are changed to an OFF state is "decrease", and the average potential of the sub pixel electrodes 124a is decreased. The first change of the storage capacitance signal voltage VLcsb after the TFTs 130b are changed to an OFF state is "increase", and the average potential of the sub pixel electrodes 124b is increased. Note that since the polarity of the pixel P at the (n+1)th row by the m'th column is negative, the luminance of the sub pixel Spa is higher than that of the sub pixel Spb in the pixel P at the (n+1)th row by the m'th column.

Although not shown herein, in the pixel P at the (n+1)th row by the (m+1)th column, the average potential of the sub pixel electrodes 124a is decreased in accordance with the storage capacitance signal voltage VLcsa, and the average potential of the sub pixel electrodes 124b is increased in accordance with the storage capacitance signal voltage VLcsb. Note that since the polarity of the pixel P at the (n+1)th row by the (m+1)th column is positive, the luminance of the sub pixel Spb is higher than that of the sub pixel Spa in the pixel P at the n'th row by the (m+1)th column.

In this manner, write to the pixels P of the (n+1)th row is performed. As described above, the polarity of the pixel P at the (n+1)th row by the (m+1)th column is inverted to the polarity of the pixel P at the (n+1)th row by the m'th column. Although not described herein in detail, the polarities of the pixels of the (n+1)th row which are adjacent to each other in the row direction are inverted to each other, similarly to the above. As described above, the sub pixel Spa is a bright sub pixel in the pixel P at the (n+1)th row by the m'th column, whereas the sub pixel Spb is a bright sub pixel in the pixel P at the (n+1)th row by the (m+1)th column. Although not described herein in detail, the bright/dark relationships of the sub pixels in the pixels of the (n+1)th row which are adjacent to each other in the row direction are inverted to each other, similarly to the above. After this, write to the pixels P of the (n+2)th row, et seq. is performed in substantially the same manner.

In this manner, in the liquid crystal display device 100, the polarities of the pixels adjacent to each other in the row direction and in the column direction are different from each other, and the polarities of the pixels adjacent in oblique directions are the same as each other. For example, the polarity of the pixels at the n'th row by the m'th column and at the (n+1)th row by the (m+1)th column is positive, whereas the polarity of the pixels at the (n+1)th row by the m'th column and at the n'th row by the (m+1)th column is negative. Such a manner of driving is referred to as "dot driving". The bright/dark relationships between the sub pixels adjacent to each other in the row direction and in the column direction are different from each other, and bright sub pixels are adjacent to each other in oblique directions.

In the immediately subsequent vertical scanning period (field period or frame period), the polarity of each pixel is inverted, and as a result, burn-in of the display is suppressed.

In the above, the cycle and phase of the storage capacitance signal voltages VLcsa and VLcsb supplied to the storage capacitance trunk lines Ltcsa and Ltcsb have been described with reference to FIG. 4. The storage capacitance signal voltages VLcsa and VLcsb are not limited to the above. Nonetheless, it is preferable that after the gate signal voltage VLg supplied to the gate bus line Lg is changed from an ON voltage to an OFF voltage, the first change of the storage capacitance signal voltage VLcsa is "increase" and the first change of the storage capacitance signal voltage VLcsb is "decrease". As described above, it is preferable that in the immediately subsequent vertical scanning period, the polarity of each pixel is inverted.

In the above description, the storage capacitance signals supplied to the CS bus lines each have a vibration voltage including a rectangular wave having a duty ratio of 1:1. The present invention is not limited to this. A vibration voltage including a rectangular wave having a duty ratio other than 1:1, a sine wave, a triangular wave or the like may be used. It is sufficient that after the TFTs connected to a plurality of sub pixels are put into an OFF state, the voltages supplied to the storage capacitance counter electrodes respectively of the plurality of sub pixels are changed, and the change amount is different among the sub pixels. Note that when the rectangular wave is used, the charge amounts with which the sub pixels (liquid crystal capacitances and the storage capacitances) are charged can be matched easily, and the effective voltages of the sub pixels can be matched easily, as described above.

In the above description made with reference to FIG. 4, different storage capacitance signals having a vibration cycle of 2H are provided for two storage capacitance trunk lines. The present invention is not limited to this. Different storage capacitance signals having a vibration cycles of 4H may be provided for four storage capacitance trunk lines. In this manner, different storage capacitance signals having a vibration cycle of NH may be provided for N-pieces of storage capacitance trunk lines (N is an even number of 2 or greater).

In the above description, the CS bus line is provided for each row of sub pixels. The present invention is not limited to this. The CS bus line may be provided so as to be shared by two rows of sub pixels belonging to two adjacent rows of pixels.

Figure 5:
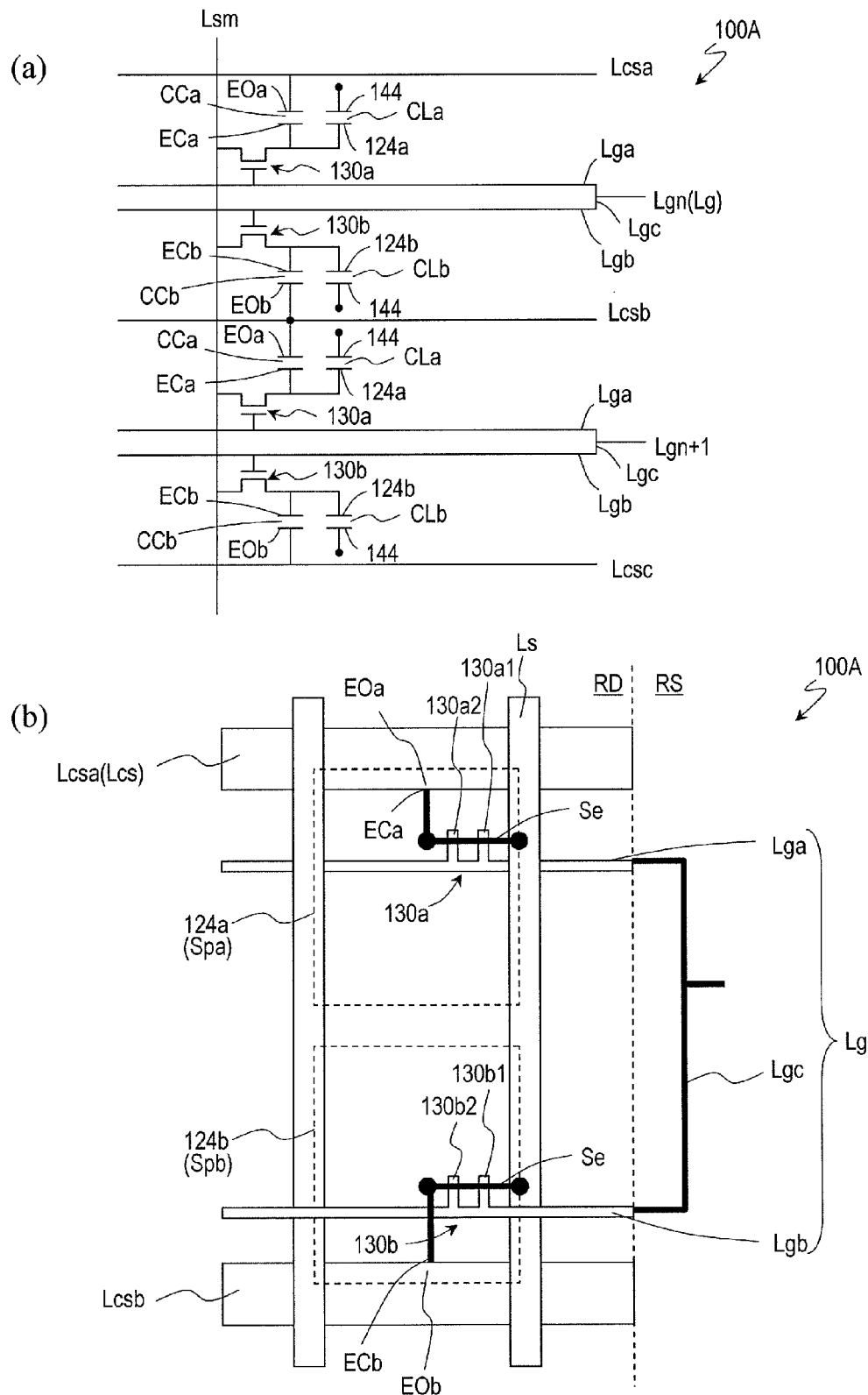
FIG. 5(*a*) is an equivalent circuit diagram of two pixels adjacent to each other in a column direction in a liquid crystal display device in another embodiment according to the present invention, and FIG. 5(*b*) is a schematic view of the liquid crystal display device.

Hereinafter, with reference to FIG. 5, a liquid crystal display device in another embodiment according to the present invention will be described. A liquid crystal display device 100A in this embodiment has substantially the same structure as that of the liquid crystal display device 100 except that the connection relationship between the CS bus lines and the sub pixels is different. Overlapping descriptions will be omitted in order to avoid redundancy.

In the liquid crystal display device 100A, a plurality of pixels P are arrayed in a plurality of rows by a plurality of columns. FIG. 5(a) is an equivalent circuit diagram of two pixels P adjacent to each other in the column direction of the liquid crystal display device 100A. In FIG. 5(a), the source bus line corresponding to the m'th column is represented as Lsm, and the gate bus lines corresponding to the n'th row and the (n+1)th row are respectively represented as Lgn and Lgn+1. In the liquid crystal display device 100A, the CS bus line Lcsb is electrically connected to the storage capacitance counter electrode EOb corresponding to the second sub pixels Spb of the pixels P of the n'th row, and is also electrically connected to the storage capacitance counter electrode EOa corresponding to the first sub pixels Spa of the pixels P in the (n+1)th row.

FIG. 5(b) is a schematic view of the liquid crystal display device 100A. In FIG. 5(b), the counter substrate 140 is omitted in order to avoid the figure from being excessively complicated. FIG. 5(b) corresponds to a plan view of the active matrix substrate 120.

In the liquid crystal display device 100A also, the two TFTs 130a1 and 130a2 are provided in correspondence with one sub pixel Spa. The TFTs 130a1 and 130a2 are arrayed in series. Similarly, the two TFTs 130b1 and 130b2 are provided in correspondence with one sub pixel Spb. The TFTs 130b1 and 130b2 are arrayed in series. Note that the gates of the TFTs 130a1 and 130a2 are electrically connected to the common gate line Lga, and the gates of the TFTs 130b1 and 130b2 are electrically connected to the common gate line Lgb. Therefore, the ON/OFF state of each of the TFTs 130a1, 130a2, 130b1 and 130b2 is changed in accordance with a gate signal voltage supplied to the corresponding gate line Lga or Lgb. In the following description, the TFTs 130a1 and 130a2 will be collectively represented as the "TFTs 130a", and the TFTs 130b1 and 130b2 will be collectively represented as the "TFTs 130b".

In the liquid crystal display device 100A, the CS bus lines Lcs each correspond to the sub pixels Spa and Spb of two pixels adjacent to each other in the column direction. For example, the CS bus line Lcsb is electrically connected to both of the storage capacitance counter electrode EOb corresponding to the second sub pixel Spb of the pixel at the n'th row by the m'th column and the storage capacitance counter electrode EOa corresponding to the first sub pixel Spa of the pixel at the (n+1)th row by the m'th column. In this manner, in the liquid crystal display device 100A, one CS bus line is shared by two sub pixels. As compared with the liquid crystal display device 100A shown in FIG. 2, the CS bus line extending between the sub pixels of two pixels adjacent to each other in the column direction can be omitted, which can realize a high aperture ratio.

In the liquid crystal display device 100A, write to the pixels P is performed as follows. First, the gate signal voltage supplied to the gate bus line Lgn corresponding to the n'th row is changed to an ON voltage, and as a result, the TFTs 130a and 130b at the n'th row by the m'th column are put into an ON state. When the pixels of the n'th row are selected in this manner, the source signal voltage supplied to the source bus line Lsm is applied to the sub pixel electrodes 124a and 124b at the n'th row by the m'th column. Then, the supplied gate signal voltage is changed from an ON voltage to an OFF voltage, and as a result, the TFTs 130a and 130b at the n'th row by the m'th column are put into an OFF state. As described above, the potentials of the sub pixel electrodes 124a and 124b are decreased due to the feedthrough phenomenon.

After the TFTs 130a and 130b at the n'th row by the m'th column are changed to an OFF state, the storage capacitance signal voltages supplied to the CS bus lines Lcsa and Lcsb are changed in different directions from each other, and as a result, the potentials of the sub pixel electrodes 124a and 124b are changed in different directions from each other. The storage capacitance signal voltage supplied to the CS bus line Lcsa may be changed before the time when the gate signal voltage supplied to the gate bus line Lgn+1 corresponding to the (n+1)th row described later is changed from an OFF voltage to an ON voltage, or may be changed after such time. Note that the storage capacitance signal voltage supplied to the CS bus line Lcsb is changed after the gate signal voltage supplied to the gate bus line Lgn+1 corresponding to the (n+1)th row described later is changed from an OFF voltage to an ON voltage.

For example, it is now assumed that the potentials of the sub pixel electrodes 124a an 124b are higher than the potential of the counter electrode 144. When, after the TFTs 130a and 130b are changed to an OFF state, the first change of the storage capacitance signal voltage supplied to the CS bus line Lcsa is "increase" and the first change of the storage capacitance signal voltage supplied to the CS bus line Lcsb is "decrease", the average potential of the sub pixel electrodes 124a is increased, and the average potential of the sub pixel electrodes 124b is decreased. The luminance of the sub pixel Spa is higher than the luminance of the sub pixel Spb. By contrast, when the first change of the storage capacitance signal voltage supplied to the CS bus line Lcsa is "decrease" and the first change of the storage capacitance signal voltage supplied to the CS bus line Lcsb is "increase", the average potential of the sub pixel electrodes 124a is decreased, and the average potential of the sub pixel electrodes 124b is increased. The luminance of the sub pixel Spb is higher than the luminance of the sub pixel Spa.

It is now assumed that the potentials of the sub pixel electrodes 124a an 124b are lower than the potential of the counter electrode 144. When, after the TFTs 130a and 130b are changed to an OFF state, the first change of the storage capacitance signal voltage supplied to the CS bus line Lcsa is "increase" and the first change of the storage capacitance signal voltage supplied to the CS bus line Lcsb is "decrease", the average potential of the sub pixel electrodes 124a is increased, and the average potential of the sub pixel electrodes 124b is decreased. The luminance of the sub pixel Spb is higher than the luminance of the sub pixel Spa. By contrast, when the first change of the storage capacitance signal voltage supplied to the CS bus line Lcsa is "decrease" and the first change of the storage capacitance signal voltage supplied to the CS bus line Lcsb is "increase", the average potential of the sub pixel electrodes 124a is decreased, and the average potential of the sub pixel electrodes 124b is increased. The luminance of the sub pixel Spa is higher than the luminance of the sub pixel Spb.

Then, the gate signal voltage supplied to the gate bus line Lgn+1 corresponding to the (n+1)th row is changed to an ON voltage, and as a result, the TFTs 130a and 130b corresponding to the gate lines Lga and Lgb of the gate bus line Lgn+1 are put into an ON state. When the pixels of the (n+1)th row are selected in this manner, the source signal voltage supplied to the source bus line Lsm is applied to the sub pixel electrodes 124a and 124b at the (n+1)th row by the m'th column. For example, when the potentials of the sub pixel electrodes 124a and 124b at the n'th row by the m'th column are higher than the potential of the counter electrode 144, the sub pixel electrodes 124a and 124b at the (n+1)th row by the m'th column are each supplied with a source signal voltage lower than the potential of the counter electrode 144.

Then, the gate signal voltage supplied to the gate bus line Lgn+1 is changed from an ON voltage to an OFF voltage, and as a result, the TFTs 130a and 130b at the (n+1)th row by the m'th column are changed to an OFF state.

Then, the storage capacitance signal voltages supplied to the CS bus lines Lcsa and Lcsb are changed, and as a result, the potentials of the sub pixel electrodes 124a and 124b are changed in accordance with the change of the storage capacitance signal voltages. The storage capacitance signal voltage supplied to the CS bus line Lcsb may be changed before the time when the gate signal voltage supplied to the gate bus line Lgn+2 corresponding to the (n+2)th row (not shown herein) is changed from an OFF voltage to an ON voltage, or may be changed after such time. Note that the voltage supplied to the CS bus line Lcsc is changed after the time when the gate signal voltage supplied to the gate bus line Lgn+2 corresponding to the (n+2)th row is changed from an OFF voltage to an ON voltage.

Figure 6:
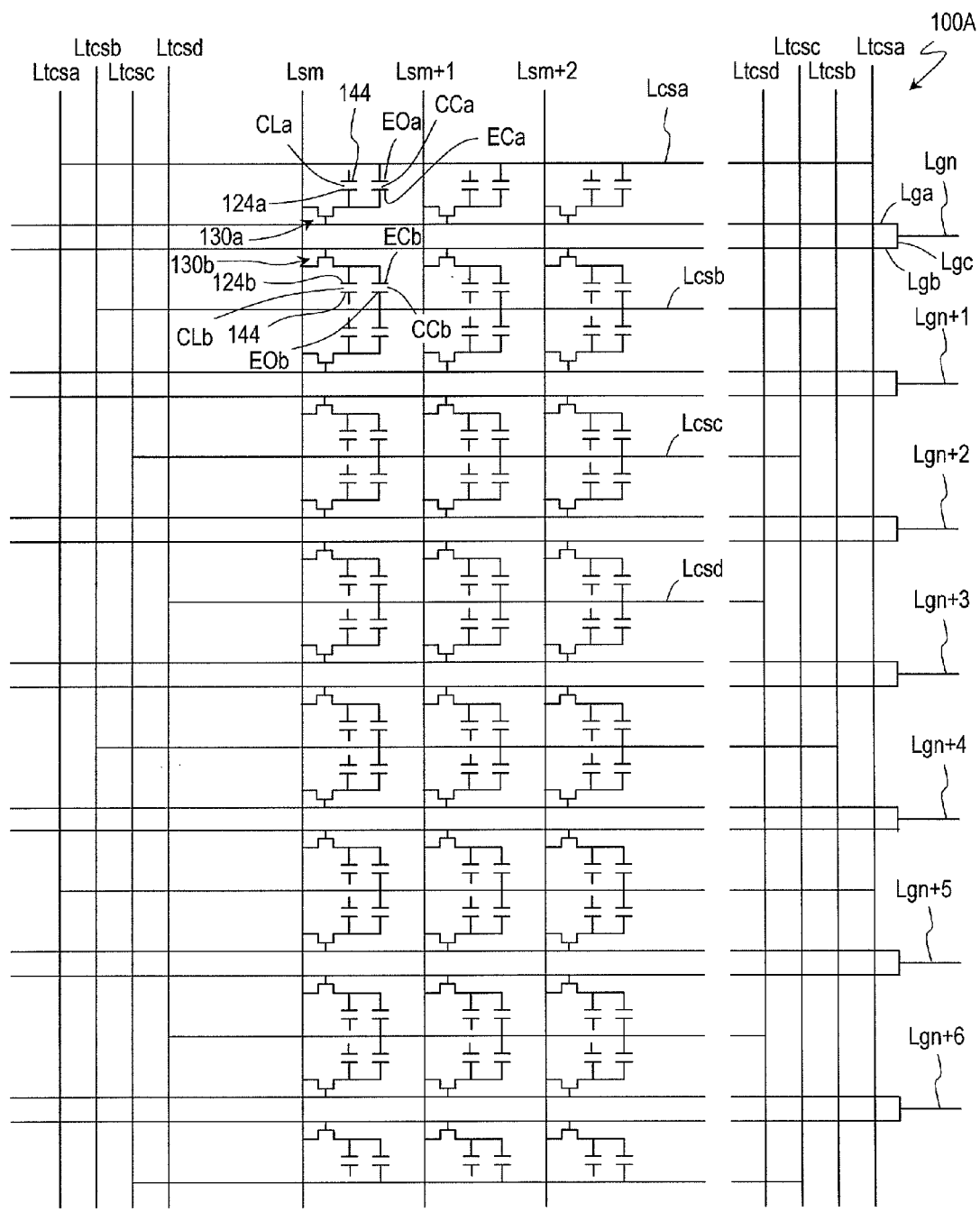
FIG. 6 is an equivalent circuit diagram of the liquid crystal display device shown in FIG. 5.

FIG. 6 is an equivalent circuit diagram of the liquid crystal display device 100A. FIG. 6 shows an equivalent circuit of a plurality of pixels P. In FIG. 6, the source bus lines corresponding to the m'th column through the (m+2)th column are respectively represented as Lsm through Lsm+2. The gate bus lines corresponding to the n'th row through the (n+6)th row are respectively represented as Lgn through Lgn+6. The CS bus lines Lcs extending from the storage capacitance trunk lines Ltcsa through Ltcsd are represented as Lcsa through Lcsd. In the liquid crystal display device 100A shown in FIG. 6, the CS bus lines Lcsa through Lcsd respectively correspond to the pixels P, more specifically, to the two sub pixels Spa and Spb of each pixel P, the pixels P being adjacent to each other in the column direction.

Figure 7:
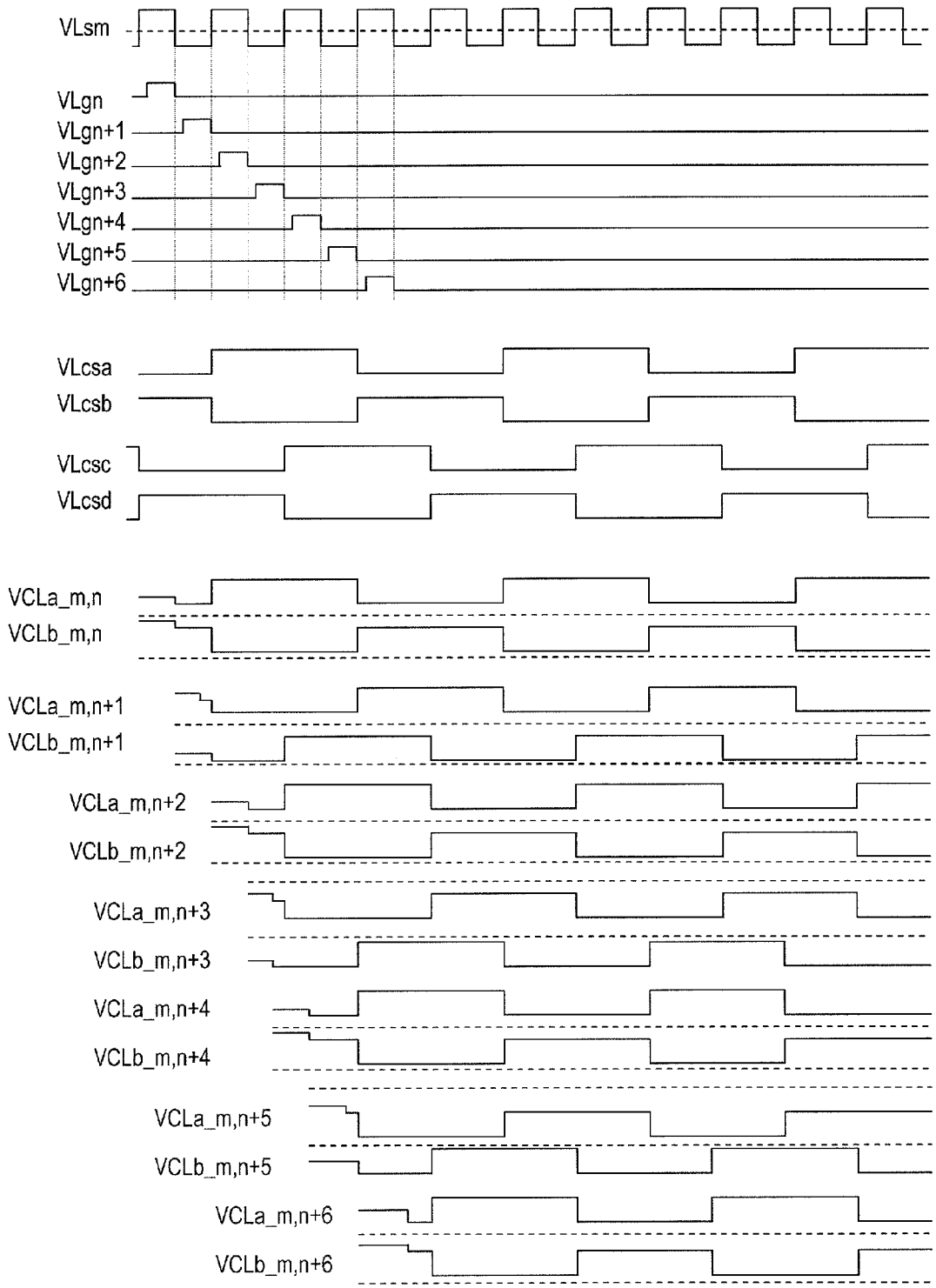
FIG. 7 is a voltage waveform diagram of signals in the liquid crystal display device shown in FIG. 5.

The liquid crystal display device 100A shown in FIG. 6 is driven, for example, as follows. FIG. 7 is a voltage waveform diagram of the liquid crystal display device 100A. In FIG. 7, VLsm represents a voltage waveform of a source signal supplied to the source bus line Lsm, which is based on the voltage of the counter electrode 144 shown with the dashed line. VLgn through VLgn+6 respectively represent voltage waveforms of gate signals supplied to the gate bus lines Lgn through Lgn+6. VLcsa through VLcsd respectively represent voltage waveforms of storage capacitance signals supplied to the CS bus lines Lcsa through Lcsd. VCLa_m,n through VCLa_m,n+6 respectively represent the potentials of the sub pixel electrodes 124a of the pixels P at the n'th row by the m'th column through (n+6)th row by the m'th column, which are based on the potential of the counter electrode 144. VCLb_m,n through VCLb_m,n+6 respectively represent the potentials of the sub pixel electrodes 124b of the pixels P at the n'th row by the m'th column through (n+6)th row by the m'th column, which are based on the potential of the counter electrode 144. In order to avoid the explanation from becoming excessively complicated, the input signals which are input herein make the gray scale levels of all the pixels equal to each other.

Herein, the storage capacitance signal voltages VLcsa through VLcsd supplied to the storage capacitance trunk lines Ltcsa through Ltcsd are each a vibration voltage including a rectangular wave having a duty ratio of 1:1. The vibration cycle of all the voltages is eight times the horizontal scanning period (time of 8H). Regarding the storage capacitance signal voltages VLcsa and VLcsb, the phase of the storage capacitance signal voltage VLcsb is delayed by the time of 4H with respect to the storage capacitance signal voltage VLcsa. Regarding the storage capacitance signal voltages VLcsc and VLcsd, the phase of the storage capacitance signal voltage VLcsd is delayed by the time of 4H with respect to the storage capacitance signal voltage VLcsc. Regarding the storage capacitance signal voltages VLcsa and VLcsc, the phase of the storage capacitance signal voltage VLcsc is delayed by the time of 2H with respect to the storage capacitance signal voltage VLcsa.

Hereinafter, with reference to FIG. 6 and FIG. 7, write to the pixels P in the liquid crystal display device 100A will be described. First, write to the pixels P of the n'th row will be described. Herein, the pixels P at the n'th row by the m'th column and the n'th row by the (m+1)th column will be specifically paid attention to.

The gate signal voltages supplied to the gate lines Lga and Lgb corresponding to the n'th row are each changed from an OFF voltage to an ON voltage, and as a result, the TFTs 130a and 130b at the n'th row by the m'th column and the n'th row by the (m+1)th column are put into an ON state. When the pixels of the n'th row are selected in this manner, the source signal voltage supplied to the source bus line Lsm is applied to the sub pixel electrodes 124a and 124b at the n'th row by the m'th column, and the source signal voltage supplied to the source bus line Lsm+1 is applied to the sub pixel electrodes 124a and 124b at the n'th row by the (m+1)th column. The source signal voltage supplied to the source bus line Lsm is higher than that of the counter electrode 144, and although not shown herein, the source signal voltage supplied to the source bus line Lsm+1 is lower than that of the counter electrode 144. In this manner, the polarities of the pixels P adjacent to each other in the row direction are different from each other.

Then, the gate signal voltages supplied to the gate lines Lga and Lgb are each changed from an ON voltage to an OFF voltage, and as a result, the TFTs 130a and 130b at the n'th row by the m'th column and the n'th row by the (m+1)th column are put into an OFF state. Precisely, immediately after the TFTs 130a and 130b are put into an OFF state, the potentials of the sub pixel electrodes 124a and 124b are decreased to substantially the same level due to the feedthrough phenomenon caused by an influence of, for example, parasitic capacitances of the TFTs 130a and 130b.

After the TFTs 130a and 130b are put into an OFF state, the storage capacitance signal voltages VLcsa and VLcsb supplied to the CS bus lines Lcsa and Lcsb are changed in different directions from each other, and as a result, the potentials of the sub pixel electrodes 124a and 124b are changed in different directions from each other. The storage capacitance signal voltages VLcsa and VLcsb are changed after the gate signal voltage VLgn+1 of the gate bus line Lgn+1 described later is changed from an ON voltage to an OFF voltage. Herein, after the TFTs 130a are changed to an OFF state, the first change of the storage capacitance signal voltage VLcsa is "increase", and the first change of the storage capacitance signal voltage VLcsa is "decrease". In case, the average potential of the sub pixel electrode 124a is increased, and the average potential of the sub pixel electrodes 124b is decreased. Since the polarity of the pixel P at the n'th row by the m'th column is positive, the luminance of the sub pixel Spa is higher than that of the sub pixel Spb in the pixel P at the n'th row by the m'th column. Although not shown herein, in the pixel P at the n'th row by the (m+1)th column, the average potential of the sub pixel electrodes 124a is increased in accordance with the storage capacitance signal voltage VLcsa, and the average potential of the sub pixel electrodes 124b is decreased in accordance with the storage capacitance signal voltage VLcsb. Note that since the polarity of the pixel P at the n'th row by the (m+1)th column is negative, the luminance of the sub pixel Spb is higher than that of the sub pixel Spa in the pixel P at the n'th row by the (m+1)th column.

In this manner, write to the pixels P of the n'th row is performed. As described above, the polarity of the pixel P at the n'th row by the (m+1)th column is inverted to the polarity of the pixel P at the n'th row by the m'th column. Although not described herein in detail, the polarities of the pixels of the n'th row which are adjacent to each other in the row direction are inverted to each other, similarly to the above. As described above, the sub pixel Spa is a bright sub pixel in the pixel P at the n'th row by the m'th column, whereas the sub pixel Spb is a bright sub pixel in the pixel P at the n'th row by the (m+1)th column. Although not described herein in detail, the bright/dark relationships of the sub pixels in the pixels of the n'th row which are adjacent to each other in the row direction are inverted to each other, similarly to the above.

Next, write to the pixels P in the (n+1)th row will be described. Herein, the pixels P at the (n+1)th row by the m'th column and the (n+1)th row by the (m+1)th column will be specifically paid attention to. The gate signal voltages supplied to the gate lines Lga and Lgb corresponding to the (n+1)th row are changed from an OFF voltage to an ON voltage, and as a result, the TFTs 130a and 130b at the (n+1)th row by the m'th column and the (n+1)th row by the (m+1)th column are put into an ON state. When the pixels of the (n+1)th row are selected in this manner, the source signal voltage supplied to the source bus line Lsm is applied to the sub pixel electrodes 124a and 124b at the (n+1)th row by the m'th column, and the source signal voltage supplied to the source bus line Lsm+1 is applied to the sub pixel electrodes 124a and 124b at the (n+1)th row by the (m+1)th column. The polarity of the pixel P at the (n+1)th row by the m'th column is different from the polarity of the pixel P at the (n+1)th row by the (m+1)th column. The polarity of the pixel P at the (n+1)th row by the m'th column is different from the polarity of the pixel P at the n'th row by the m'th column. The polarity of the pixel P at the (n+1)th row by the (m+1)th column is different from the polarity of the pixel P at the n'th row by the (m+1)th column.

Then, the gate signal voltage supplied to the gate line Lga+1 is changed from an ON voltage to an OFF voltage, and as a result, the TFTs 130a and 130b at the (n+1)th row by the m'th column and the (n+1)th row by the (m+1)th column are put into an OFF state. After the TFTs 130a and 130b are put into an OFF state, the storage capacitance signal voltages VLcsb and VLcsc supplied to the CS bus lines Lcsb and Lcsc are changed in different directions from each other. Although not described herein in detail, the storage capacitance signal voltage VLcsc is changed after the gate signal voltage VLgn+3 of the gate bus line Lgn+3 is changed from an ON voltage to an OFF voltage. Herein, after the TFTs 130a and 130b are changed to an OFF state, the first change of the storage capacitance signal voltage VLcsb is "decrease", and the first change of the storage capacitance signal voltage VLcsc "increase". In this case, the average potential of the sub pixel electrodes 124a is decreased, and the average potential of the sub pixel electrodes 124b is increased. Since the polarity of the pixel P at the (n+1)th row by the m'th column is negative, the luminance of the sub pixel Spa is higher than that of the sub pixel Spb in the pixel P at the (n+1)th row by the m'th column.

Although not shown herein, in the pixel P at the (n+1)th row by the (m+1)th column, the average potential of the sub pixel electrodes 124a is decreased in accordance with the storage capacitance signal voltage VLcsb, and the average potential of the sub pixel electrodes 124b is increased in accordance with the storage capacitance signal voltage VLcsc. Note that since the polarity of the pixel P at the (n+1)th row by the (m+1)th column is positive, the luminance of the sub pixel Spb is higher than that of the sub pixel Spa in the pixel P at the (n+1)th row by the (m+1)th column.

In this manner, write to the pixels P of the (n+1)th row is performed. As described above, the polarities of the pixels of the (n+1)th row which are adjacent to each other in the row direction are inverted to each other. The bright/dark relationships of the sub pixels in the pixels of the (n+1)th row which are adjacent to each other in the row direction are inverted to each other. Write to the pixels P of the (n+2)th row, et seq. is performed in substantially the same manner.

In this manner, in the liquid crystal display device 100, the polarities of the pixels adjacent to each other in the row direction and in the column direction are different from each other, and the polarities of the pixels adjacent in oblique directions are the same as each other. For example, the polarity of the pixels at the n'th row by the m'th column and at the (n+1)th row by the (m+1)th column is positive, whereas the polarity of the pixels at the (n+1)th row by the m'th column and at the n'th row by the (m+1)th column is negative. The bright/dark relationships of the sub pixels which are adjacent to each other in the row direction and in the column direction are different from each other, and the bright sub pixels are adjacent to each other in oblique directions. In the immediately subsequent vertical scanning period (field period or frame period), the polarity of each pixel is inverted, and as a result, burn-in of the display is suppressed.

In the above description, the storage capacitance signals supplied to the CS bus lines each have a vibration voltage including a rectangular wave having a duty ratio of 1:1. The present invention is not limited to this. A vibration voltage including a rectangular wave having a duty ratio other than 1:1, a sine wave, a triangular wave or the like may be used. It is sufficient that after the TFTs connected to a plurality of sub pixels are put into an OFF state, the voltages supplied to the storage capacitance counter electrodes respectively of the plurality of sub pixels are changed, and the change amount is different among the sub pixels.

In the above description made with reference to FIG. 7, different storage capacitance signals having a vibration cycle of 8H are provided for four storage capacitance trunk lines. The present invention is not limited to this. Different storage capacitance signals having a vibration cycle of 12H may be provided for six storage capacitance trunk lines. In this manner, different storage capacitance signals having a vibration cycle of (2×N)×K×H (K is a positive integer) may be provided for N-pieces of storage capacitance trunk lines (N is an even number of 2 or greater). Alternatively, different storage capacitance signals having a vibration cycle of 1H may be provided for two storage capacitance trunk lines.

The liquid crystal display devices 100 and 100A may each be of a so-called MVA mode. In an MVA-mode liquid crystal display device, linear slits formed in electrodes or linear dielectric projections (ribs) formed on the electrodes on the liquid crystal layer side are located, on a pair of substrates facing each other while having a liquid crystal layer therebetween, to be parallel to, and alternate to, each other when seen in a direction normal to the substrates. Owing to this, the azimuth directions of directors of the liquid crystal domains formed at the time of voltage application are regulated. The azimuth direction of each liquid crystal domain is perpendicular to the azimuth direction in which the linear slits or dielectric projections (collectively referred to as the "linear structures") extend. In the MVA mode, the gate lines Lga and Lgb may be located so as to overlap the borders between different liquid crystal domains.

The liquid crystal display devices 100 and 100A may each be of a PSA mode. The polymer sustained alignment technology (hereinafter, referred to as the "PSA technology") is disclosed in, for example, Japanese Laid-Open Patent Publications Nos. 2002-357830, 2003-177418 and 2006-78968, and K. Hanaoka et al., "A New MVA-LCD by Polymer Sustained Alignment Technology", SID 04 DIGEST, pp. 1200-1203 (2004). The disclosures of these four documents are entirely incorporated herein by reference.

According to the PSA technology, the pretilt direction of the liquid crystal molecules is controlled as follows. A small amount of polymerizable compound (e.g., a photopolymerizable monomer or oligomer) is mixed in a liquid crystal material. After a liquid crystal panel is assembled, the polymerizable compound is irradiated with active energy rays (e.g., ultraviolet rays) in the state where a prescribed voltage is applied to the liquid crystal layer. The pretilt direction of the liquid crystal molecules is controlled by the polymer which is thus generated. The alignment state of the liquid crystal molecules realized when the polymer is generated is maintained (stored) even after the voltage is removed (in the absence of the voltage). Herein, the layer formed of the polymer will be referred to as an "alignment sustaining layer". The alignment sustaining layer is formed on surfaces of alignment films (on the liquid crystal layer side). The alignment sustaining layer does not need to be in the form of a film covering the surfaces of the alignment films, and may be in the form of particles of the polymer discretely provided.

The PSA technology can adjust the pretilt azimuth direction and the pretilt angle of the liquid crystal molecules by controlling the electric field or the like formed in the liquid crystal layer. In addition, since an alignment sustaining layer expresses an alignment regulating force on substantially the entire plane thereof contacting the liquid crystal layer, a high response characteristic is provided.

A PSA-mode liquid crystal display device is obtained by applying, for example, the above-described PSA technology. Although not shown herein, the sub pixel electrodes 124a and 124b each have cross-shaped trunk portions located so as to overlap polarization axes of the pair of polarizing plates, and a plurality of branch portions extending in a direction of about 45° from the cross-shaped trunk portions. Specifically, the branch portions extend in an azimuth direction of 45°, 135°, 225° and 315° from the trunk portions. The liquid crystal molecules in the vertical alignment type liquid crystal layer (having negative dielectric anisotropy) are tilted in an azimuth direction in which the branch portions extend because of the oblique electric field from the trunk and branch portions. A reason for this is that an oblique electric field from the branch portions extending parallel to each other acts to tilt the liquid crystal molecules in an azimuth direction perpendicular to the directions in which the corresponding branch portions extend, and an oblique electric field from the trunk portions acts to tilt the liquid crystal molecules in the azimuth directions in which the corresponding branch portions extend. By use of the PSA technology, the above-described alignment of the liquid crystal molecules which is formed when a voltage is applied to the liquid crystal layer can be stabilized. In the PSA mode also, the gate lines Lga and Lgb may be located so as to overlap the borders between different liquid crystal domains.

Alternatively, a vertical alignment type liquid crystal display device may include an optical alignment film as an alignment film. Typically, optical alignment films each having an alignment-processed area in a sub pixel are respectively provided on the active matrix substrate 120 and the counter substrate 140. The alignment process on one of the optical alignment films is performed antiparallel to the alignment process on the other optical alignment film. Such a pair of alignment films are located such that the alignment directions of the areas facing each other are perpendicular to each other. Liquid crystal molecules in the vicinity of the optical alignment films are slightly tilted with respect to the direction normal to the main surfaces of the optical alignment films. The optical alignment film may be provided on either one of the active matrix substrate 120 and the counter substrate 140. In a liquid crystal display device using such an optical alignment film also, the gate lines Lga and Lgb may be located so as to overlap the borders between different liquid crystal domains.

Still alternatively, the liquid crystal display devices 100 and 100A may each be of a CPA mode. For example, the sub pixels 124a and 124b may have highly symmetrical shapes, and liquid crystal molecules in each of the liquid crystal domains are tilted axially symmetrically by voltage application on the liquid crystal layer 160.

In the above description, the liquid crystal display device is of a vertical alignment type. The present invention is not limited to this. The liquid crystal display device may be of any other mode.

In the above description, the pixels are rectangular. The present invention is not limited to this. The pixels may have any other shape.

Industrial Applicability

A liquid crystal display device according to the present invention can suppress change of a parasitic capacitance caused by an alignment shift between the gate bus line and the sub pixel electrode. In addition, a liquid crystal display device according to the present invention can improve the viewing angle characteristic without increasing the power consumption.

REFERENCE SIGNS LIST

100 Liquid crystal display device
120 Active matrix substrate

124 Pixel electrode
130 TFT
140 Counter substrate
144 Counter electrode
160 Liquid crystal layer

The invention claimed is:

1. A liquid crystal display device, comprising:
an active matrix substrate; a counter substrate; and
a liquid crystal layer located between the active matrix substrate and the counter substrate; wherein:
the active matrix substrate includes:
 a plurality of pixel electrodes defining each of a plurality of pixels, the plurality of pixel electrodes each including a first sub pixel electrode and a second sub pixel electrode, both of the first sub pixel electrode and the second sub pixel electrode are transparent electrodes;
 a plurality of thin film transistors each including a gate, a source and a drain, the plurality of thin film transistors including a first thin film transistor and a second thin film transistor;
 a plurality of storage capacitance electrodes including a first storage capacitance electrode electrically connected to the drain of the first thin film transistor and the first sub pixel electrode, and a second storage capacitance electrode electrically connected to the drain of the second thin film transistor and the second sub pixel electrode;
a plurality of storage capacitance bus lines including a first storage capacitance bus line electrically connected to a first storage capacitance counter electrode which provides a storage capacitance together with the first storage capacitance electrode, and a second storage capacitance bus line electrically connected to a second storage capacitance counter electrode which provides a storage capacitance together with the second storage capacitance electrode;
 a source bus line electrically connected to the source of the first thin film transistor and the source of the second thin film transistor; and
 a gate bus line including a first gate line electrically connected to the gate of the first thin film transistor, a second gate line electrically connected to the gate of the second thin film transistor, and a connection line arranged to electrically connect the first gate line and the second gate line to each other; and
the first sub pixel electrode extends over the first gate line, and the second sub pixel electrode extends over the second gate line.

2. The liquid crystal display device of claim 1, comprising a display region in which the plurality of pixels are provided; and a peripheral region in which the connection line is provided.

3. The liquid crystal display device of claim 1, wherein:
the plurality of pixel electrodes are arrayed in a row direction and a column direction; and
the first gate line and the second gate line extend in the row direction.

4. The liquid crystal display device of claim 1, wherein a size of an overlapping area of the first gate line and the first sub pixel electrode is approximately equal to a size of an overlapping area of the second gate line and the second sub pixel electrode.

5. The liquid crystal display device of claim 1, wherein a distance between the center of the first sub pixel electrode and the center of the second sub pixel electrode, a distance between the center line of the first gate line and the center line of the second gate line, and a distance between the center line of the first storage capacitance bus line and the center line of the second storage capacitance bus line are approximately equal to each other.

6. The liquid crystal display device of claim 1, wherein:
the first storage capacitance bus line is supplied with a first storage capacitance signal; and
the second storage capacitance bus line is supplied with a second storage capacitance signal which is different from the first storage capacitance signal.

7. The liquid crystal display device of claim 1, wherein the liquid crystal layer is of a vertical alignment type.

* * * * *